United States Patent
Zhang et al.

(10) Patent No.: US 11,997,033 B2
(45) Date of Patent: May 28, 2024

(54) DETECTING A CONTROL CHANNEL IN A SEARCH SPACE

(71) Applicant: HUAWEI TECHNOLOGIES CO., LTD., Guangdong (CN)

(72) Inventors: Xu Zhang, Beijing (CN); Fei Gao, Shanghai (CN); Shujing Yu, Beijing (CN); Lixia Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 508 days.

(21) Appl. No.: 17/213,749

(22) Filed: Mar. 26, 2021

(65) Prior Publication Data

US 2021/0218526 A1 Jul. 15, 2021

Related U.S. Application Data

(63) Continuation of application No. PCT/CN2019/108695, filed on Sep. 27, 2019.

(30) Foreign Application Priority Data

Sep. 28, 2018 (CN) .......................... 201811142738.6

(51) Int. Cl.
 *H04L 5/00* (2006.01)
 *H04W 72/0453* (2023.01)
 *H04W 72/23* (2023.01)

(52) U.S. Cl.
 CPC ....... *H04L 5/0048* (2013.01); *H04W 72/0453* (2013.01); *H04W 72/23* (2023.01)

(58) Field of Classification Search
 CPC .... H04L 5/0048; H04W 72/23; H04W 2/0453
 See application file for complete search history.

(56) References Cited

U.S. PATENT DOCUMENTS

| 2014/0105154 | A1 | 4/2014 | Yang et al. |
| 2018/0227156 | A1 | 8/2018 | Papasakellariou |
| 2022/0124686 | A1* | 4/2022 | Lee ........................... H04L 1/00 |
| 2022/0303957 | A1* | 9/2022 | Elshafie ................ H04L 5/0053 |

(Continued)

FOREIGN PATENT DOCUMENTS

| CN | 102255688 A | 11/2011 |
| CN | 105553622 A | 5/2016 |
| CN | 107888361 A | 4/2018 |

(Continued)

OTHER PUBLICATIONS

Office Action issued in Chinese Application No. 201811142738.6 dated Mar. 28, 2022, 8 pages.

(Continued)

*Primary Examiner* — Mewale A Ambaye
(74) *Attorney, Agent, or Firm* — Fish & Richardson P.C.

(57) ABSTRACT

This application provides a control channel detection method, apparatus, and device. The method includes: A terminal device determines that resources of at least two candidate control channels overlap, where any two of the at least two candidate control channels are located in different search spaces; and the terminal device detects only at least one first candidate control channel in the at least two candidate control channels. This improves control channel detection reliability.

20 Claims, 7 Drawing Sheets

S601 — A network device sends a control channel, where the control channel is located in a common search space S602 — The network device sends a data channel, where the data channel is scheduled through the control channel

(56) References Cited

U.S. PATENT DOCUMENTS

2022/0312381 A1\* 9/2022 Chen .................... H04W 72/23

FOREIGN PATENT DOCUMENTS

| CN | 108347778 A | 7/2018 | | |
|----|----|----|----|----|
| CN | 110034881 A | 7/2019 | | |
| EP | 2547017 A2 \* | 1/2013 | ........... | H04L 1/0027 |
| EP | 2547017 A2 | 1/2013 | | |

OTHER PUBLICATIONS

Office Action issued in Chinese Application No. 201811142738.6 dated Sep. 15, 2021, 16 pages (with English translation).
Extended European Search Report issued in European Application No. 19866364.3 dated Nov. 16, 2021, 9 pages.
Mediatek Inc., "Remaining Issues on PDCCH Structure," 3GPP TSG RAN WG1 Meeting #91, R1-1719553, Reno, USA, Nov. 27-Dec. 1, 2017, 4 pages.
3GPP TS 36.213 V15.2.0 (Jun. 2018), "3rd Generation Partnership Project; Technical Specification Group Radio Access Network; Evolved Universal Terrestrial Radio Access (E-UTRA); Physical layer procedures (Release 15)," Jun. 2018, 541 pages.
3GPP TS 38.212 V15.3.0 (Sep. 2018), "3rd Generation Partnership Project; Technical Specification Group Radio Access Network; NR; Multiplexing and channel coding (Release 15)," Sep. 2018, 99 pages.
3GPP TS 38.213 V15.2.0 (Jun. 2018), "3rd Generation Partnership Project; Technical Specification Group Radio Access Network; NR; Physical layer procedures for control (Release 15)," Jun. 2018, 99 pages.
Huawei, HiSilicon, "Remaining issues on reserved resources and rate-matching," 3GPP TSG RAN WG1 Meeting #92, R1-1801349, Athens, Greece, Feb. 26-Mar. 2, 2018, 5 pages.
PCT International Search Report and Written Opinion issued in International Application No. PCT/CN2019/108695 dated Jan. 2, 2020, 13 pages (with English translation).

\* cited by examiner

DETECTING A CONTROL CHANNEL IN A SEARCH SPACE

CROSS-REFERENCE TO RELATED APPLICATIONS

This application is a continuation of International Application No. PCT/CN2019/108695, filed on Sep. 27, 2019, which claims priority to Chinese Patent Application No. 201811142738.6, filed on Sep. 28, 2018. The disclosures of the aforementioned applications are hereby incorporated by reference in their entireties.

TECHNICAL FIELD

This application relates to the field of communications technologies, and in particular, to a control channel detection method, apparatus, and device.

BACKGROUND

In a wireless communication process, a base station may configure a plurality of search spaces for a terminal device, and each search space includes a plurality of candidate control channels. The terminal device may detect, in the plurality of search spaces, a downlink control channel sent by the base station.

Candidate control channels included in different search spaces configured by the base station for the terminal device may use a same resource (overlapping resource). For example, a candidate control channel 1 in a search space set 1 and a candidate control channel 4 in a search space set 2 use a same resource. After detecting a control channel on the overlapping resource, the terminal device cannot determine a search space to which the control channel belongs. Because different search spaces correspond to different control channel formats, the terminal device cannot determine a format of the control channel, and consequently cannot correctly parse the received control channel. This causes relatively low control channel detection reliability.

SUMMARY

This application provides a control channel detection method, apparatus, and device, to improve control channel detection reliability.

According to a first aspect, this application provides a control channel detection method. When a terminal device determines that resources of at least two candidate control channels overlap, the terminal device detects only at least one first candidate control channel in the at least two candidate control channels, where any two of the at least two candidate control channels are located in different search spaces.

In the foregoing process, when the resources of the at least two candidate control channels overlap, the terminal device detects only the at least one first candidate control channel in the at least two candidate control channels, to prevent the terminal device from detecting candidate control channels in different formats on a same resource, so that the terminal device can determine a format of a detected control channel, and then the terminal device can correctly parse the received control channel. This improves control channel detection reliability.

Optionally, a search space may be a set of candidate control channels at a same aggregation level.

Optionally, an aggregation level of a candidate control channel may be a quantity of control channel elements CCEs corresponding to resources of the candidate control channel.

In a possible implementation, search spaces in which the at least two candidate control channels are located include a first-type search space and a second-type search space.

Optionally, the first-type search space may be a common search space, and the second-type search space may be a specific search space.

In another possible implementation, the type of a search space in which the at least one first candidate control channel is located is the first-type, and the at least two candidate control channels meet at least one of the following conditions:

Condition 1: None of the at least two candidate control channels includes a carrier indicator field.

Condition 2: The at least two candidate control channels include a candidate control channel used for a first downlink control information format and a candidate control channel used for a second downlink control information format.

The first downlink control information format may be a non-fallback format, and the second downlink control information format may be a fallback format.

In the foregoing process, when the search spaces in which the at least two candidate control channels are located include the common search space and the specific search space, and the at least two candidate control channels meet at least one of the foregoing condition 1 or condition 2, the terminal device detects only a candidate control channel in the common search space. In this way, the terminal device does not need to detect a plurality of different downlink control information formats, so as to avoid a case in which the terminal device cannot correctly parse, when parsing a received control channel, downlink control information sent by a network device. This improves reliability of transmitting control information and/or transmitting a data channel scheduled by using the control information.

In another possible implementation, a candidate control channel that is in the at least two candidate control channels and that is located in the second-type search space is a subset of a candidate control channel that is in the at least two candidate control channels and that is located in the first-type search space.

In another possible implementation, the search space in which the at least one first candidate control channel is located is the first-type search space or the second-type search space; and the at least one first candidate control channel is related to indexes of the at least two candidate control channels and/or at least one of indexes of search space sets in which the at least two candidate control channels are located. In this way, when resources of each candidate control channel located in the second-type search space and a candidate control channel located in the first-type search space overlap, it can be ensured that there are some candidate control channels located in the second-type search space, and it is ensured that candidate control channels located in different types of search spaces have a same sending resource. This reduces a probability that a candidate control channel located in the second-type search space is blocked by a candidate control channel located in the first-type search space.

In another possible implementation, a search space in which the at least one first candidate control channel is located is a second-type search space, search spaces in which the at least two candidate control channels are located each are the second-type search space, and each of the at least one first candidate control channel is used for a first downlink control information format.

The at least two candidate control channels meet at least one of the following conditions:

Condition 1: None of the at least two candidate control channels includes a carrier indicator field.

Condition 2: The at least two candidate control channels include the candidate control channel used for the first downlink control information format and a candidate control channel used for a second downlink control information format.

Condition 3: Each of the at least two candidate control channels is used for the first downlink control information format.

The first downlink control information format may be a non-fallback format, and the second downlink control information format may be a fallback format.

In the foregoing process, when the search spaces in which the at least two candidate control channels are located are all specific search spaces, if the at least two candidate control channels include a candidate control channel used for a non-fallback format, only the candidate control channel used for the non-fallback format in the at least two candidate control channels is detected. Compared with a control channel in a fallback format, content indicated by indication information in the control channel in the non-fallback format is more flexible, and sending of the candidate control channel in the non-fallback format can improve spectral efficiency of data transmission. This improves data channel transmission efficiency.

In another possible implementation, each of the at least one first candidate control channel is used for a second downlink control information format, each of the at least two candidate control channels is used for the second downlink control information format, and none of the at least two candidate control channels includes a carrier indicator field.

In another possible implementation, a search space in which the at least one first candidate control channel is located is a second-type search space, search spaces in which the at least two candidate control channels are located each are the second-type search space, each of the at least one first candidate control channel is used for a first downlink control information format, and each of the at least one first candidate control channel includes a carrier indicator field.

The at least two candidate control channels meet at least one of the following conditions:

only some of the at least two candidate control channels each include a carrier indicator field, or only some of the at least two candidate control channels each do not include a carrier indicator field;

the at least two candidate control channels include the candidate control channel used for the first downlink control information format and the candidate control channel used for the second downlink control information format; and each of the at least two candidate control channels is used for the first downlink control information format.

In another possible implementation, a search space in which the at least one first candidate control channel is located is a second-type search space; and only some of the at least one first candidate control channel each include a carrier indicator field, or only some of the at least one first candidate control channel each do not include a carrier indicator field. The at least two candidate control channels meet at least one of the following conditions:

only some of the at least two candidate control channels each include a carrier indicator field, or only some of the at least two candidate control channels each do not include a carrier indicator field;

the at least two candidate control channels include the candidate control channel used for the first downlink control information format and the candidate control channel used for the second downlink control information format; and each of the at least two candidate control channels is used for the first downlink control information format.

In another possible implementation, the terminal device detects a second control channel in the at least one first candidate control channel.

A search space in which the second control channel is located is the first-type search space, a start resource block of a data channel scheduled through the second control channel is a start resource block in a control-resource set, and the control-resource set is a control-resource set associated with a search space set in which the second control channel is located; or a search space in which the second control channel is located is the second-type search space, a start resource block of a data channel scheduled through the second control channel is a start resource block in a bandwidth part, and the bandwidth part is a bandwidth part indicated by the second control channel.

In all the foregoing possible implementations, the at least two candidate control channels meet at least one of the following conditions:

the search spaces in which the at least two candidate control channels are located are located on a same component carrier or different component carriers;

the at least two candidate control channels include a same start control channel element index;

the at least two candidate control channels have a same payload size; and cyclic redundancy codes CRC of the at least two control channels are scrambled by using a C-RNTI or a CS-RNTI.

In another possible implementation, search space sets in which the at least two candidate control channels are located are associated with a same control-resource set.

In another possible implementation, the at least two candidate control channels include one or more same CCE indexes.

In another possible implementation, the at least two candidate control channels include a same start CCE index.

In another possible implementation, a payload of downlink control information in the first downlink control information format is greater than a payload of downlink control information in the second downlink control information format.

In another possible implementation, the terminal device detects a third control channel, and if downlink control information carried on the third control channel is successfully checked based on a first check sequence, the terminal device determines that a format of the downlink control information carried on the third control channel is a format corresponding to the first check sequence. The format corresponding to the first check sequence includes at least one of a fallback format or a non-fallback format.

In another possible implementation, the terminal device detects a fourth control channel, and determines, based on indication information in downlink control information carried on the fourth control channel, a format of the downlink control information carried on the fourth control channel.

According to a second aspect, this application provides a control channel detection method. A network device sends a second control channel, and sends a first data channel, where the first data channel is scheduled through the second control channel. The second control channel is a control channel in the at least two candidate control channels, resources of the at least two candidate control channels overlap, and any two of the at least two candidate control channels are located in different search spaces. It should be noted that the method provided in the second aspect is a method applied to a network device side, and specific steps correspond to specific steps in the method that is provided in the first aspect and that is applied to a terminal device side. For details, refer to the related descriptions in the first aspect.

The network device does not send a candidate control channel other than at least one first candidate control channel in the at least two candidate control channels, where the second control channel is one of the at least one first candidate control channel.

Optionally, the network device determines the at least one first candidate control channel. Further, the network device determines the second control channel in the at least one first candidate control channel.

In the foregoing process, when the network device determines that the resources of the at least two candidate control channels located in the different search spaces overlap, the network device sends only a first candidate control channel in the at least one first candidate control channel, to prevent a terminal device from detecting candidate control channels in different formats on a same resource, so that the terminal device can determine a format of a detected control channel, and then the terminal device can correctly parse the received control channel. This improves control channel detection reliability.

In a possible implementation, search spaces in which the at least two candidate control channels are located include a first-type search space and a second-type search space.

The first-type search space may be a common search space.

The second-type search space may be a specific search space.

In another possible implementation, the type of a search space in which the at least one first candidate control channel is located is the first-type, and the at least two candidate control channels meet at least one of the following conditions:

Condition 1: None of the at least two candidate control channels includes a carrier indicator field.

Condition 2: The at least two candidate control channels include a candidate control channel used for a first downlink control information format and a candidate control channel used for a second downlink control information format.

The first downlink control information format may be a non-fallback format.

The second downlink control information format may be a fallback format.

In the foregoing process, when the search spaces in which the at least two candidate control channels are located are all specific search spaces, if the at least two candidate control channels include a candidate control channel used for a non-fallback format, the network device sends only the candidate control channel used for the non-fallback format in the at least two candidate control channels. In this way, the terminal device does not need to detect a plurality of different downlink control information formats, so as to avoid a case in which the terminal device cannot correctly parse, when parsing a received control channel, downlink control information sent by the network device. This improves reliability of transmitting control information and/or transmitting a data channel scheduled by using the control information.

In another possible implementation, a candidate control channel that is in the at least two candidate control channels and that is located in the second-type search space is a subset of a candidate control channel that is in the at least two candidate control channels and that is located in the first-type search space.

In another possible implementation, the search space in which the at least one first candidate control channel is located is the first-type search space or the second-type search space; and the at least one first candidate control channel is related to indexes of the at least two candidate control channels and/or at least one of indexes of search space sets in which the at least two candidate control channels are located. In this way, when resources of each candidate control channel located in the second-type search space and a candidate control channel located in the first-type search space overlap, it can be ensured that there are some candidate control channels located in the second-type search space, and it is ensured that candidate control channels located in different types of search spaces have a same sending resource. This reduces a probability that a candidate control channel located in the second-type search space is blocked by a candidate control channel located in the first-type search space.

In another possible implementation, a search space in which the at least one first candidate control channel is located is a second-type search space, search spaces in which the at least two candidate control channels are located each are the second-type search space, and each of the at least one first candidate control channel is used for a first downlink control information format.

In the foregoing process, when the search spaces in which the at least two candidate control channels are located are all specific search spaces, if the at least two candidate control channels include a candidate control channel used for a non-fallback format, only the candidate control channel used for the non-fallback format in the at least two candidate control channels is detected. Compared with a control channel in a fallback format, content indicated by indication information in the control channel in the non-fallback format is more flexible, and sending of the candidate control channel in the non-fallback format can improve spectral efficiency of data transmission. This improves data channel transmission efficiency.

In another possible implementation, each of the at least one first candidate control channel is used for a second downlink control information format, each of the at least two candidate control channels is used for the second downlink control information format, and none of the at least two candidate control channels includes a carrier indicator field.

In another possible implementation, the at least two candidate control channels meet at least one of the following conditions:

none of the at least two candidate control channels includes a carrier indicator field;

the at least two candidate control channels include the candidate control channel used for the first downlink control information format and the candidate control channel used for the second downlink control information format: and each of the at least two candidate control channels is used for the first downlink control information format.

In another possible implementation, each of the at least one first candidate control channel includes a carrier indicator field.

The at least two candidate control channels meet at least one of the following conditions:
only some of the at least two candidate control channels each include a carrier indicator field, or only some of the at least two candidate control channels each do not include a carrier indicator field;
the at least two candidate control channels include the candidate control channel used for the first downlink control information format and the candidate control channel used for the second downlink control information format: and
each of the at least two candidate control channels is used for the first downlink control information format.

In another possible implementation, a search space in which the at least one first candidate control channel is located is a second-type search space.

Only some of the at least one first candidate control channel each include a carrier indicator field, or only some of the at least one first candidate control channel each do not include a carrier indicator field.

In another possible implementation, a start resource block of the first data channel is a start resource block in a control-resource set, the control-resource set is a control-resource set associated with a search space set in which the second control channel is located, and a search space in which the second control channel is located is the first-type search space; or
a start resource block of the first data channel is a start resource block in a bandwidth part, the bandwidth part is a bandwidth part indicated by the second control channel, and a search space in which the second control channel is located is the second-type search space.

In another possible implementation, the at least two candidate control channels meet at least one of the following conditions:
the search spaces in which the at least two candidate control channels are located are located on a same component carrier or different component carriers;
the at least two candidate control channels include a same start control channel element index;
the at least two candidate control channels have a same payload size: and
cyclic redundancy codes CRC of the at least two control channels are scrambled by using a cell radio network temporary identifier C-RNTI or a CS-RNTI.

In another possible implementation, search space sets in which the at least two candidate control channels are located are associated with a same control-resource set.

In another possible implementation, the at least two candidate control channels include one or more same CCE indexes.

In another possible implementation, the at least two candidate control channels include a same start CCE index.

In another possible implementation, a payload of downlink control information in the first downlink control information format is greater than a payload of downlink control information in the second downlink control information format.

In another possible implementation, the terminal device detects a third control channel, and if downlink control information carried on the third control channel is successfully checked based on a first check sequence, the terminal device determines that a format of the downlink control information carried on the third control channel is a format corresponding to the first check sequence. The format corresponding to the first check sequence includes at least one of a fallback format or a non-fallback format.

In another possible implementation, the terminal device detects a fourth control channel, and determines, based on indication information in downlink control information carried on the fourth control channel, a format of the downlink control information carried on the fourth control channel.

According to a third aspect, this application provides a communication method. A terminal device receives a control channel located in a common search space, and determines a scheduled data channel based on the control channel.

In a possible implementation, the terminal device may obtain control information and a control channel CRC scrambling codeword from the control channel, and determine the scheduled data channel based on the control information and the scrambling codeword.

In another possible implementation, if a CRC of the control channel detected by the terminal device is scrambled by using a C-RNTI and/or a CS-RNTI, a start resource block of the data channel scheduled through the control channel is a start resource block in a bandwidth part (BWP), and the bandwidth part is a bandwidth part indicated by a first candidate control channel.

In another possible implementation, if a CRC of the control channel detected by the terminal device is scrambled by using a first RNTI, a start resource block of the data channel scheduled through the control channel is a start resource block in a control-resource set, or a start resource block of the data channel scheduled through the control channel is a width of a start resource in an initial bandwidth part.

Optionally, the first RNTI is an RNTI that does not include at least a C-RNTI and/or a CS-RNTI.

In another possible implementation, if a CRC of the control channel detected by the terminal device is scrambled by using an SI-RNTI or a P-RNTI, a start resource block of the data channel scheduled through the control channel is a start resource block in a control-resource set, and the control-resource set is a control-resource set associated with a search space set in which the control channel is located; or a start resource block of the data channel scheduled through the control channel is a width of a start resource in an initial bandwidth part.

In another possible implementation, if a CRC of the control channel detected by the terminal device is scrambled by using a second RNTI, a start resource block of the data channel scheduled through the control channel is a start resource block in a bandwidth part (BWP), and the bandwidth part is a bandwidth part indicated by a first candidate control channel.

Optionally, the second RNTI is a C-RNTI and/or a CS-RNTI.

In another possible implementation, if a CRC of the control channel is scrambled by using a C-RNTI and/or a CS-RNTI, a start resource block of the data channel scheduled through the control channel is a start resource block in a bandwidth part (BWP), and the bandwidth part is a bandwidth part indicated by a first candidate control channel.

According to a fourth aspect, this application provides a communication method. A network device sends a control channel in a common search space, and sends a data channel, where the data channel is scheduled through the control channel.

In a possible implementation, if a CRC of the control channel is scrambled by using a C-RNTI and/or a CS-RNTI, a start resource block of the data channel scheduled through the control channel is a start resource block in a bandwidth part (BWP), and the bandwidth part is a bandwidth part indicated by a first candidate control channel.

In another possible implementation, if a CRC of the control channel is scrambled by using a first RNTI, a start resource block of the data channel scheduled through the control channel is a start resource block in a control-resource set, or a start resource block of the data channel scheduled through the control channel is a width of a start resource in an initial bandwidth part.

Optionally, the first RNTI is an RNTI that does not include at least a C-RNTI and/or a CS-RNTI.

In another possible implementation, if a CRC of the control channel is scrambled by using an SI-RNTI or a CRC of the control channel is scrambled by using a P-RNTI, a start resource block of the data channel scheduled through the control channel is a start resource block in a control-resource set, and the control-resource set is a control-resource set associated with a search space set in which the control channel is located; or a start resource block of the data channel scheduled through the control channel is a width of a start resource in an initial bandwidth part.

In another possible implementation, if a CRC of the control channel is scrambled by using a second RNTI, a start resource block of the data channel scheduled through the control channel is a start resource block in a bandwidth part (BWP), and the bandwidth part is a bandwidth part indicated by a first candidate control channel.

Optionally, the second RNTI is a C-RNTI and/or a CS-RNTI.

In another possible implementation, if a CRC of the control channel is scrambled by using a C-RNTI and/or a CS-RNTI, a start resource block of the data channel scheduled through the control channel is a start resource block in a bandwidth part (BWP), and the bandwidth part is a bandwidth part indicated by a first candidate control channel.

According to a fifth aspect, this application provides a control channel detection apparatus, including a determining module and a detection module.

The determining module is configured to determine that resources of at least two candidate control channels overlap, where any two of the at least two candidate control channels are located in different search spaces.

The detection module is configured to detect only at least one first candidate control channel in the at least two candidate control channels.

In a possible implementation, search spaces in which the at least two candidate control channels are located include a first-type search space and a second-type search space.

In another possible implementation, the type of a search space in which the at least one first candidate control channel is located is the first-type.

The at least two candidate control channels meet at least one of the following conditions:
  none of the at least two candidate control channels includes a carrier indicator field; and
  the at least two candidate control channels include a candidate control channel used for a first downlink control information format and a candidate control channel used for a second downlink control information format.

In another possible implementation, a candidate control channel that is in the at least two candidate control channels and that is located in the second-type search space is a subset of a candidate control channel that is in the at least two candidate control channels and that is located in the first-type search space.

In another possible implementation, the search space in which the at least one first candidate control channel is located is the first-type search space or the second-type search space.

The at least one first candidate control channel is related to indexes of the at least two candidate control channels and/or at least one of indexes of search space sets in which the at least two candidate control channels are located.

In another possible implementation, a search space in which the at least one first candidate control channel is located is a second-type search space, search spaces in which the at least two candidate control channels are located each are the second-type search space, and each of the at least one first candidate control channel is used for a first downlink control information format.

In another possible implementation, each of the at least one first candidate control channel is used for a second downlink control information format, each of the at least two candidate control channels is used for the second downlink control information format, and none of the at least two candidate control channels includes a carrier indicator field.

In another possible implementation, the at least two candidate control channels meet at least one of the following conditions:
  none of the at least two candidate control channels includes a carrier indicator field;
  the at least two candidate control channels include the candidate control channel used for the first downlink control information format and the candidate control channel used for the second downlink control information format; and
  each of the at least two candidate control channels is used for the first downlink control information format.

In another possible implementation, each of the at least one first candidate control channel includes a carrier indicator field.

The at least two candidate control channels meet at least one of the following conditions:
  only some of the at least two candidate control channels each include a carrier indicator field, or only some of the at least two candidate control channels each do not include a carrier indicator field;
  the at least two candidate control channels include the candidate control channel used for the first downlink control information format and the candidate control channel used for the second downlink control information format; and
  each of the at least two candidate control channels is used for the first downlink control information format.

In another possible implementation, a search space in which the at least one first candidate control channel is located is a second-type search space.

Only some of the at least one first candidate control channel each include a carrier indicator field, or only some of the at least one first candidate control channel each do not include a carrier indicator field.

In another possible implementation, the first-type search space is a common search space: and/or
  the second-type search space is a specific search space; and/or
  the first downlink control information format is a non-fallback format: and/or
  the second downlink control information format is a fallback format.

In another possible implementation, the detection module detects a second control channel in the at least one first candidate control channel.

A search space in which the second control channel is located is the first-type search space, a start resource block of a data channel scheduled through the second control channel is a start resource block in a control-resource set, and the control-resource set is a control-resource set associated with a search space set in which the second control channel is located; or a search space in which the second control channel is located is the second-type search space, a start resource block of a data channel scheduled through the second control channel is a start resource block in a bandwidth part, and the bandwidth part is a bandwidth part indicated by the second control channel.

In another possible implementation, the at least two candidate control channels meet at least one of the following conditions:

the search spaces in which the at least two candidate control channels are located are located on a same component carrier or different component carriers;

the at least two candidate control channels include a same start control channel element index;

the at least two candidate control channels have a same payload size: and cyclic redundancy codes CRC of the at least two control channels are scrambled by using a cell radio network temporary identifier C-RNTI or a configured scheduling radio network temporary identifier CS-RNTI.

According to a sixth aspect, this application provides a control channel detection apparatus, including a sending module.

The sending module is configured to send a second control channel, where the second control channel is a control channel in at least two candidate control channels, resources of the at least two candidate control channels overlap, and any two of the at least two candidate control channels are located in different search spaces.

The sending module is further configured to send a first data channel, where the first data channel is scheduled through the second control channel.

In a possible implementation, the sending module does not send a candidate control channel other than at least one first candidate control channel in the at least two candidate control channels, where the second control channel is one of the at least one first candidate control channel.

In another possible implementation, the control channel detection apparatus further includes a determining module.

The determining module is configured to determine the second control channel.

The determining module is further configured to determine the at least one first candidate control channel, and determine the second control channel in the at least one first candidate control channel.

In another possible implementation, search spaces in which the at least two candidate control channels are located include a first-type search space and a second-type search space.

In another possible implementation, the type of a search space in which the at least one first candidate control channel is located is the first-type.

The at least two candidate control channels meet at least one of the following conditions:

none of the at least two candidate control channels includes a carrier indicator field; and the at least two candidate control channels include a candidate control channel used for a first downlink control information format and a candidate control channel used for a second downlink control information format.

In another possible implementation, a candidate control channel that is in the at least two candidate control channels and that is located in the second-type search space is a subset of a candidate control channel that is in the at least two candidate control channels and that is located in the first-type search space.

In another possible implementation, the search space in which the at least one first candidate control channel is located is the first-type search space or the second-type search space.

The at least one first candidate control channel is related to indexes of the at least two candidate control channels and/or at least one of indexes of search space sets in which the at least two candidate control channels are located.

In another possible implementation, a search space in which the at least one first candidate control channel is located is a second-type search space, search spaces in which the at least two candidate control channels are located each are the second-type search space, and each of the at least one first candidate control channel is used for a first downlink control information format.

In another possible implementation, each of the at least one first candidate control channel is used for a second downlink control information format, each of the at least two candidate control channels is used for the second downlink control information format, and none of the at least two candidate control channels includes a carrier indicator field.

In another possible implementation, the at least two candidate control channels meet at least one of the following conditions:

none of the at least two candidate control channels includes a carrier indicator field;

the at least two candidate control channels include the candidate control channel used for the first downlink control information format and the candidate control channel used for the second downlink control information format: and each of the at least two candidate control channels is used for the first downlink control information format.

In another possible implementation, each of the at least one first candidate control channel includes a carrier indicator field.

The at least two candidate control channels meet at least one of the following conditions:

only some of the at least two candidate control channels each include a carrier indicator field, or only some of the at least two candidate control channels each do not include a carrier indicator field;

the at least two candidate control channels include the candidate control channel used for the first downlink control information format and the candidate control channel used for the second downlink control information format: and each of the at least two candidate control channels is used for the first downlink control information format.

In another possible implementation, a search space in which the at least one first candidate control channel is located is a second-type search space.

Only some of the at least one first candidate control channel each include a carrier indicator field, or only some of the at least one first candidate control channel each do not include a carrier indicator field.

In another possible implementation, the first-type search space is a common search space; and/or
   the second-type search space is a specific search space; and/or
   the first downlink control information format is a non-fallback format; and/or
   the second downlink control information format is a fallback format.

In another possible implementation, a start resource block of the first data channel is a start resource block in a control-resource set, the control-resource set is a control-resource set associated with a search space set in which the second control channel is located, and a search space in which the second control channel is located is the first-type search space; or
   a start resource block of the first data channel is a start resource block in a bandwidth part, the bandwidth part is a bandwidth part indicated by the second control channel, and a search space in which the second control channel is located is the second-type search space.

In another possible implementation, the search spaces in which the at least two candidate control channels are located are located on a same component carrier or different component carriers;
   the at least two candidate control channels include a same start control channel element index;
   the at least two candidate control channels have a same payload size; and
   cyclic redundancy codes CRC of the at least two control channels are scrambled by using a cell radio network temporary identifier C-RNTI or a configured scheduling radio network temporary identifier CS-RNTI.

According to a seventh aspect, this application provides a communications apparatus, and the communications apparatus includes a receiving module and a determining module.

The receiving module is configured to receive a control channel located in a common search space.

The determining module is configured to determine a scheduled data channel based on the control channel.

In a possible implementation, the determining module may obtain control information and a control channel CRC scrambling codeword from the control channel, and determine the scheduled data channel based on the control information and the scrambling codeword.

In another possible implementation, if a CRC of the control channel is scrambled by using a C-RNTI and/or a CS-RNTI, a start resource block of the data channel scheduled through the control channel is a start resource block in a bandwidth part (BWP), and the bandwidth part is a bandwidth part indicated by a first candidate control channel.

In another possible implementation, if a CRC of the control channel is scrambled by using a first RNTI, a start resource block of the data channel scheduled through the control channel is a start resource block in a control-resource set, or a start resource block of the data channel scheduled through the control channel is a width of a start resource in an initial bandwidth part.

Optionally, the first RNTI is an RNTI that does not include at least a C-RNTI and/or a CS-RNTI.

In another possible implementation, if a CRC of the control channel is scrambled by using an SI-RNTI or a P-RNTI, a start resource block of the data channel scheduled through the control channel is a start resource block in a control-resource set, and the control-resource set is a control-resource set associated with a search space set in which the control channel is located; or a start resource block of the data channel scheduled through the control channel is a width of a start resource in an initial bandwidth part.

In another possible implementation, if a CRC of the control channel is scrambled by using a second RNTI, a start resource block of the data channel scheduled through the control channel is a start resource block in a bandwidth part (BWP), and the bandwidth part is a bandwidth part indicated by a first candidate control channel.

Optionally, the second RNTI is a C-RNTI and/or a CS-RNTI.

In another possible implementation, if a CRC of the control channel is scrambled by using a C-RNTI and/or a CS-RNTI, a start resource block of the data channel scheduled through the control channel is a start resource block in a bandwidth part (BWP), and the bandwidth part is a bandwidth part indicated by a first candidate control channel.

According to an eighth aspect, this application provides another communications apparatus, including a sending module.

The sending module is configured to send a control channel, where the control channel is located in a common search space.

The sending module is further configured to send a data channel, where the data channel is scheduled through the control channel.

In a possible implementation, if a CRC of the control channel is scrambled by using a C-RNTI and/or a CS-RNTI, a start resource block of the data channel scheduled through the control channel is a start resource block in a bandwidth part (BWP), and the bandwidth part is a bandwidth part indicated by a first candidate control channel.

In another possible implementation, if a CRC of the control channel is scrambled by using a first RNTI, a start resource block of the data channel scheduled through the control channel is a start resource block in a control-resource set, or a start resource block of the data channel scheduled through the control channel is a width of a start resource in an initial bandwidth part.

Optionally, the first RNTI is an RNTI that does not include at least a C-RNTI and/or a CS-RNTI.

In another possible implementation, if a CRC of the control channel is scrambled by using an SI-RNTI or a CRC of the control channel is scrambled by using a P-RNTI, a start resource block of the data channel scheduled through the control channel is a start resource block in a control-resource set, and the control-resource set is a control-resource set associated with a search space set in which the control channel is located; or a start resource block of the data channel scheduled through the control channel is a width of a start resource in an initial bandwidth part.

In another possible implementation, if a CRC of the control channel is scrambled by using a second RNTI, a start resource block of the data channel scheduled through the control channel is a start resource block in a bandwidth part (BWP), and the bandwidth part is a bandwidth part indicated by a first candidate control channel.

Optionally, the second RNTI is a C-RNTI and/or a CS-RNTI.

In another possible implementation, if a CRC of the control channel is scrambled by using a C-RNTI and/or a CS-RNTI, a start resource block of the data channel scheduled through the control channel is a start resource block in a bandwidth part (BWP), and the bandwidth part is a bandwidth part indicated by a first candidate control channel.

According to a ninth aspect, this application provides a control channel detection apparatus, including a memory and a processor. The processor executes a program instruction in the memory, to implement the control channel detection method according to any one of the first aspect and the possible implementations of the first aspect.

According to a tenth aspect, this application provides a control channel detection apparatus, including a memory and a processor. The processor executes a program instruction in the memory, to implement the control channel detection method according to any one of the second aspect and the possible implementations of the second aspect.

According to an eleventh aspect, this application provides a control channel detection apparatus, including a memory and a processor. The processor executes a program instruction in the memory, to implement the communication method according to any one of the third aspect and the possible implementations of the third aspect.

According to a twelfth aspect, this application provides a control channel detection apparatus, including a memory and a processor. The processor executes a program instruction in the memory, to implement the communication method according to any one of the fourth aspect and the possible implementations of the fourth aspect.

According to a thirteenth aspect, this application provides a storage medium. The storage medium is configured to store a computer program, and the computer program is used to implement the control channel detection method according to any one of the first aspect and the possible implementations of the first aspect.

According to a fourteenth aspect, this application provides a storage medium. The storage medium is configured to store a computer program, and the computer program is used to implement the control channel detection method according to any one of the second aspect and the possible implementations of the second aspect.

According to a fifteenth aspect, this application provides a storage medium. The storage medium is configured to store a computer program, and the computer program is used to implement the communication method according to the third aspect.

According to a sixteenth aspect, this application provides a storage medium. The storage medium is configured to store a computer program, and the computer program is used to implement the communication method according to the fourth aspect.

According to the control channel detection method, apparatus, and device provided in this application, when the terminal device determines that the resources of the at least two candidate control channels located in the different search spaces overlap, the terminal device detects only the at least one first candidate control channel in the at least two candidate control channels, so that the terminal device can determine a format of a detected control channel, and then the terminal device can correctly parse the detected control channel based on the format of the control channel. This improves control channel detection reliability.

DESCRIPTION OF EMBODIMENTS

Figure 1:
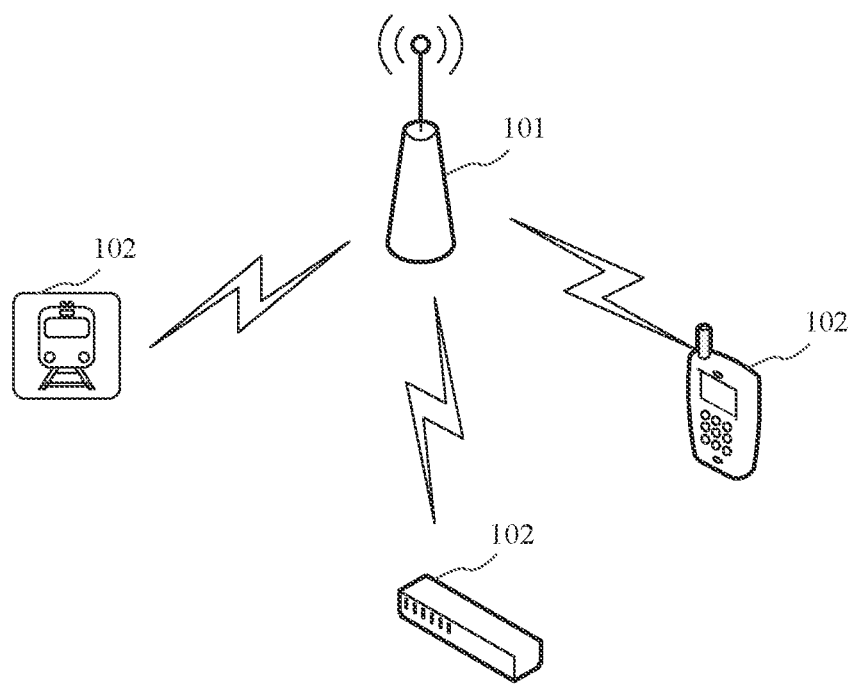
FIG. 1 is a diagram of an architecture of a communications system according to this application.

FIG. 1 is a diagram of an architecture of a communications system according to this application. Referring to FIG. 1, the communications system includes a network device 101 and a plurality of terminal devices 102.

Optionally, the network device 101 may include a fourth generation mobile communication technology (4G for short) evolved NodeB (eNB for short), a transmission reception point, a micro base station, or the like. Certainly, the network device may alternatively include a fifth generation mobile communication technology (5G for short) gNodeB (gNB for short). This is not specifically limited in this application.

Optionally, the terminal device 102 may include but is not limited to user equipment (UE for short), a mobile station (MS for short), a mobile terminal (MT for short), a mobile telephone (MT for short), a handset (handset), portable equipment (portable equipment), and the like. The terminal device may communicate with one or more core networks through a radio access network (RAN for short). For example, the terminal device may be a mobile phone (or referred to as a "cellular" phone) or a computer having a wireless communication function. Alternatively, the terminal device may be a portable, pocket-sized, handheld, computer built-in, or in-vehicle mobile apparatus or device.

It should be noted that FIG. 1 is merely an example diagram of the architecture of the communications system to which this application is applicable, and is not construed as a limitation on the architecture of the communications system to which this application is applicable.

In an actual application process, the network device may configure one or more search space sets for the terminal device, and each search space set includes at least one search space. One search space corresponds to one aggregation level, and search spaces in one search space set correspond to different aggregation levels (Aggregation Level).

Optionally, one search space includes a plurality of candidate control channels, and candidate control channels in one search space correspond to a same aggregation level. An aggregation level corresponding to a search space may also be referred to as an aggregation level of a candidate control channel in the search space, and an aggregation level of a candidate control channel may be a quantity of control channel elements (CCE for short) corresponding to resources of the candidate control channel. For example, a candidate control channel whose aggregation level is 2 includes two CCEs. The aggregation level may be any one of 1, 2, 4, 8, 16, and 32.

It should be noted that a control channel (or a candidate control channel) described in this application may include a physical downlink control channel (PDCCH for short).

Optionally, a search space set may be configured as a common search space set or a specific search space set. A search space set configured as a common search space set is also referred to as a common search space (Common Search space), and a search space set configured as a specific search space set is also referred to as a user equipment-specific search space (UE-specific Search space). All search spaces in a common search space set are common search spaces, and aggregation levels included in the common search spaces are one or more of 1, 2, 4, 8, 16, and 32. All search spaces in a specific search space set are user equipment-specific search spaces, and aggregation levels of the user equipment-specific search spaces may be one or more of 1, 2, 4, 8, 16, and 32. For example, if aggregation levels included in a search space set configured as a common search space are {4, 8, 16}, the search space set includes a search space whose aggregation level is 4, a search space whose aggregation level is 8, and a search space whose aggregation level is 16. For another example, if aggregation levels included in a search space set configured as a user equipment-specific search space are {2, 4, 8, 16}, the search space set includes a search space whose aggregation level is 2, a search space whose aggregation level is 4, a search space whose aggregation level is 8, and a search space whose aggregation level is 16. Optionally, the network device may configure a search space set for the terminal device by sending configuration information of the search space set. Optionally, configuration information of one search space set may include at least one of the following information: a control information format used by a candidate control channel in the search space set for carrying, an aggregation level of a search space included in the search space set, a quantity of candidate control channels included in a search space corresponding to each aggregation level, an index of an associated control-resource set, a search space set type (for example, a common search space set or a specific search space set), a detection period for the search space set, and the like. In this specification, a downlink control information (DCI for short) format used by a candidate control channel for carrying, a downlink control information format carried on a candidate control channel, a downlink control information format used by a candidate control channel, or a candidate control channel used for a downlink control information format (PDCCH candidate for DCI format) is used to indicate a corresponding mapping relationship or a correspondence between the candidate control channel and the downlink control information format.

Optionally, candidate control channels in different types of search space sets carry different downlink control information formats. For example, downlink control information formats carried on control channels in a search space set configured as a specific search space set are a DCI format 1_1 and a DC format 0_1, or a DC format 0_0 and a DCI format 1_0, where the DCI format 11 and the DCI format 1_0 are downlink control information formats used for downlink shared channel scheduling, and the DCI format 0_1 and the DCI format 0_0 are downlink control information formats used for uplink shared channel scheduling; and downlink control information formats carried on control channels in a search space set configured as a common search space set are a DCI format 0_0 and a DCI format 1_0, where the DCI format 1_0 is a downlink control information format used for downlink shared channel scheduling, and the DCI format 00 is a downlink control information format used for uplink shared channel scheduling. The foregoing DCI formats are classified into fallback formats and non-fallback formats. The fallback formats include the DCI format 0_0 and the DCI format 1_0, and the non-fallback formats include the DCI format 1_1 and/or the DCI format 0_1. In the following, DCI in a fallback format, a fallback DCI format, and a fallback format may be interchangeably used: and DCI in a non-fallback format, a non-fallback DCI format, and a non-fallback format may be interchangeably used.

DCI in a fallback format does not include a carrier indicator field (Carrier indication field), and DCI in a non-fallback format may include a carrier indicator field, or may not include a cross-carrier indicator field. A higher layer parameter may be used to configure whether DCI in a non-fallback format in a serving cell (Serving cell) in which the terminal device is located includes a cross-carrier indicator field. The higher layer parameter is RRC signaling, and the RRC signaling is used to configure cross-carrier scheduling.

Optionally, the network device may configure an associated control-resource set (CORESET) for a search space set by configuring an index of the associated control-resource set.

Optionally, one control-resource set may be associated with one or more search space sets, and one search space set can be associated with only one control-resource set.

For example, the network device configures an index of a control-resource set 1 as 1 and an index of a control-resource set 2 as 2; configures a search space set 1, a search space set 2, and a search space set 3; configures an index of a control-resource set associated with the search space set 1 and the search space set 2 as 1; and configures an index of a control-resource set associated with the search space set 3 as 2. In this case, the search space set 1 and the search space set 2 are associated with the control-resource set 1, and the search space set 3 is associated with the control-resource set 2. It should be noted that, because the search space set 1 is associated with the control-resource set 1, resources of one or more candidate control channels in the search space set 1 are CCEs in the control-resource set 1. Subsequent operations can be deduced by analogy, and details are not described below.

Correspondingly, the terminal device may obtain a resource of each candidate control channel in the search space set based on the configuration information of the search space set.

Optionally, a CCE included in a candidate control channel in each search space set may be determined based on a quantity of CCEs in a control-resource set associated with the search space set, an aggregation level corresponding to the search space set, and a quantity of candidate control channels included at the aggregation level.

For example, the search space set 1 is associated with the control-resource set 1, a quantity $N_{CCE}$ of CCEs included in the control-resource set 1 is 16, and the 16 CCEs are respectively denoted as a CCE 0, a CCE 1, a CCE 2, a CCE 3, a CCE 4, a CCE 5, a CCE 6, a CCE 7, a CCE 8, a CCE 9, a CCE 10, a CCE 11, a CCE 12, a CCE 13, a CCE 14, and a CCE 15.

In addition, the search space set includes two search spaces, and aggregation levels are respectively 1 and 2, where the search space whose aggregation level is 1 includes four candidate control channels, and the search space whose aggregation level is 2 includes two candidate control channels. It is assumed that a CCE included in a candidate control channel m whose aggregation level is L meets the following formula:

$$L\{(Y+\lfloor m \cdot N_{CCE}/(L \cdot M_{max}^L) \rfloor + n) \bmod \lfloor N_{CCE}/L \rfloor\} + i$$

Herein, Y and n are real numbers $M^L$ is a quantity of candidate control channels included in a search space whose aggregation level is L; m is a candidate control channel index, and a value set is $\{0, \ldots, M^L-1\}$; a value set of i is $(0, \ldots, L-1; M_{max}^L$ indicates a maximum quantity of candidate control channels in the search space whose aggregation level is L on different carriers; and mod indicates a modulo operation. Without loss of generality, assuming that Y=0, n=0, and $M_{max}^L=M^L$, CCEs included in candidate control channels in a search space whose aggregation level is 1 are described as follows: {CCE 0}, {CCE 4}, {CCE 8}, and {CCE 12}; and CCEs included in candidate control channels in a search space whose aggregation level is 2 are described as follows: {CCE 0, CCE 1} and {CCE 8, CCE 9}.

It should be noted that resources of candidate control channels in one search space are different, and resources of candidate control channels in different search spaces may overlap. Specifically, that a plurality of resources overlap means that the plurality of resources overlap in one region, in other words, the plurality of resources include a same time domain and/or frequency domain resource.

Optionally, the resource overlapping means that resources of candidate control channels in different search space sets overlap.

For example, resources of candidate control channels included in search spaces in different search space sets may overlap. As described above, the search space set 1 is associated with the control-resource set 1, and the search space set includes the search space whose aggregation level is 1 and the search space whose aggregation level is 2. CCEs included in candidate control channels in the search space whose aggregation level is 1 are described as follows: The candidate control channel 1 includes {CCE 0}, the candidate control channel 2 includes {CCE 4}, the candidate control channel 3 includes {CCE 8}, and the candidate control channel 4 includes {CCE 12}. CCEs included in candidate control channels in the search space whose aggregation level is 2 are described as follows: The candidate control channel 5 includes {CCE 0, CCE 1}, and the candidate control channel 6 includes {CCE 8, CCE 9}. In addition, the search space set 2 is configured to be associated with the control-resource set 1, the search space set 2 includes a search space whose aggregation level is 2, and the search space whose aggregation level is 2 includes four candidate control channels. In this case, according to the foregoing method for determining a candidate control channel, CCEs included in the candidate control channels are determined as follows:

The candidate control channel 7 includes {CCE 0, CCE 1}, the candidate control channel 8 includes {CCE 4, CCE 5}, the candidate control channel 9 includes {CCE 8, CCE 9}, and the candidate control channel 10 includes {CCE 12, CCE 13}.

It can be learned from the foregoing descriptions that resources of the candidate control channel 1 and the candidate control channel 5 in the search space set 1 and the candidate control channel 7 in the search space set 2 overlap; resources of the candidate control channel 2 in the search space set 1 and the candidate control channel 8 in the search space set 2 overlap; resources of the candidate control channel 3 and the candidate control channel 6 in the search space set 1 and the candidate control channel 9 in the search space set 2 overlap: and resources of the candidate control channel 4 in the search space set 1 and the candidate control channel 10 in the search space set 2 overlap.

Further, optionally, the resource overlapping may mean that resources of candidate control channels in different search spaces in one search space set overlap.

For example, resources of candidate control channels in different search spaces in one search space set may overlap. As described above, one search space set includes a search space whose aggregation level is 1 and a search space whose aggregation level is 2. CCEs included in candidate control channels in the search space whose aggregation level is 1 are described as follows: The candidate control channel 1 includes {CCE 0}, the candidate control channel 2 includes {CCE 4}, the candidate control channel 3 includes {CCE 8}, and the candidate control channel 4 includes {CCE 12}. CCEs included in candidate control channels in the search space whose aggregation level is 2 are described as follows: The candidate control channel 5 includes {CCE 0, CCE 1}, and the candidate control channel 6 includes {CCE 8, CCE 9}. The overlapping resource CCE 0 exists between the candidate control channel 1 and the candidate control channel 5, and the overlapping resource {CCE 8} exists between the candidate control channel 3 and the candidate control channel 6.

The network device sends a control channel in a configured search space. The sent control channel meets at least one of the following conditions: a quantity of CCEs included in the control channel is an aggregation level of the search space; a resource of the control channel is in resources of the search space; a payload size of control information carried on the control channel is determined by a downlink control information format of the search space; and a scrambling code of cyclic redundancy check (CRC for short) of the control channel is a scrambling code corresponding to the downlink control information format.

There are a plurality of scrambling codes for control information CRC scrambling, for example, a system information radio network temporary identifier (SI-RNTI for short), a random access radio network temporary identifier (RA-RNTI), a cell radio network temporary identifier (C-RNTI for short), and a configured scheduling radio network temporary identifier (CS-RNTI for short). One downlink control information format corresponds to a plurality of scrambling codes for control information CRC scrambling. Different downlink control information formats may correspond to a same scrambling code for control information CRC scrambling. For example, a CRC of the DCI format 0_0/1_0 may be scrambled by using the C-RNTI and/or the CS-RNTI. In addition, the DCI format 0_1 and/or the DCI format 1_1 may also be scrambled by using the C-RNTI and/or the CS-RNTI.

In this application, when the terminal device determines that resources of at least two candidate control channels located in different search spaces overlap, downlink control information formats carried on the at least two candidate control channels are different, but control information payload sizes corresponding to the downlink control information formats are the same, and CRCs of the carried downlink control information formats are scrambled by using a same terminal identifier such as the C-RNTI and/or the CS-RNTI. In this case, the terminal device detects only at least one first candidate control channel in the at least two candidate control channels, so that the terminal device can determine a format of a detected control channel, and correctly parse the detected control channel based on the format of the control channel. This improves control channel detection reliability. Otherwise, because different downlink control information formats include different downlink control information field sets, the terminal device cannot correctly obtain downlink control information sent by the network device.

It should be noted that a format of a control channel shown in this application may be a format of downlink control information carried on the control channel, and the format of the downlink control information is described above. Details are not described herein again.

When the network device determines that resources of at least two candidate control channels located in different search spaces overlap, downlink control information formats carried on the at least two candidate control channels are different, but control information payload sizes corresponding to the downlink control information formats are the same, and CRCs of the carried downlink control information formats are scrambled by using a same terminal identifier such as the C-RNTI and/or the CS-RNTI. In this case, the network device sends only a first candidate control channel in the at least one first candidate control channel, so that the terminal device can determine a format of a detected control channel, and then the terminal device can correctly parse the detected control channel based on the format of the control channel. This improves control channel detection reliability.

The following describes in detail technical solutions shown in this application by using specific embodiments. It should be noted that the following several specific embodiments may be combined with each other, and same or similar content is not described repeatedly in different embodiments. In addition, all "optional" solutions in the embodiments of this application may be implemented by superimposing any one of the foregoing optional solutions or designs in the embodiments.

Figure 2:
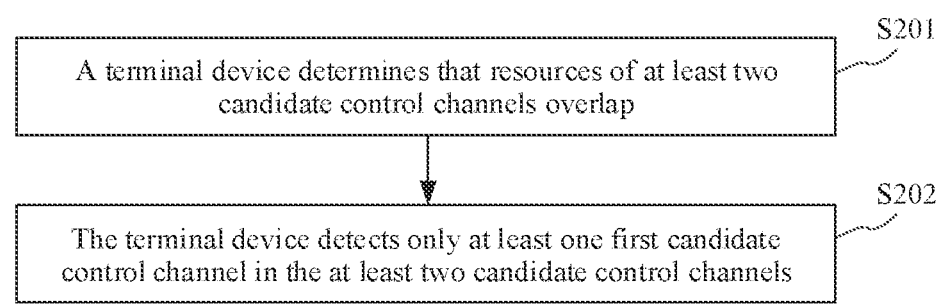
FIG. 2 is a schematic flowchart of a control channel detection method according to this application.

FIG. 2 is a schematic flowchart of a control channel detection method according to this application. Referring to FIG. 2, the method may include the following steps.

S201: A terminal device determines that resources of at least two candidate control channels overlap.

Any two of the at least two candidate control channels are located in different search spaces.

It should be noted that a resource of a candidate control channel described in this application may be a logical resource of the candidate control channel, and the logical resource of the candidate control channel may be represented by using a CCE index of the candidate control channel.

Optionally, the terminal device may determine a resource of each candidate control channel in a search space set based on a control channel resource set associated with the search space set and/or configuration information of the search space set. Optionally, the configuration information of the search space set may include at least one of the following information, a control information format carried on a candidate control channel in the search space set, an aggregation level of a search space included in the search space set, a quantity of candidate control channels included in a search space corresponding to each aggregation level, a search space set type (for example, a common search space set or a specific search space set), an index of the associated control-resource set, and the like.

In a feasible implementation, the terminal device may determine a resource of each candidate control channel in a search space set based on configuration information of the search space set.

For example, the configuration information of the search space set includes an index of an associated control-resource set, an aggregation level in the search space set, and quantities of candidate control channels at different aggregation levels.

The terminal device may obtain, based on an index of an associated control-resource set, a quantity of CCEs included in the control-resource set, an aggregation level of each search space in a search space set, and quantities of candidate control channels at different aggregation levels, to determine a CCE in each candidate control channel in the search space set. A specific determining method is described above.

In another feasible implementation, the terminal device may determine a resource of each candidate control channel in a search space set based on a control channel resource set associated with the search space set and configuration information of the search space set.

For example, the terminal device obtains, based on an associated control-resource set, a quantity of CCEs included in the control-resource set, an aggregation level corresponding to each search space in a search space set, and quantities of candidate control channels at different aggregation levels, to determine a CCE in each candidate control channel in the search space set. A specific determining method is described above.

In another feasible implementation, the terminal device may determine a resource of each candidate control channel in a search space set based on a control channel resource set associated with the search space set.

For example, aggregation levels included in the search space set and quantities of candidate control channels included in search spaces corresponding to different aggregation levels are predefined values. To be specific, a search space whose aggregation level is 4 includes four candidate control channels, a search space whose aggregation level is 8 includes two candidate control channels, and a search space whose aggregation level is 16 includes one candidate control channel. The terminal device determines, based on the quantity of CCEs included in the control-resource set associated with the search space set, the aggregation levels included in the search space set and quantities of candidate control channels included in search spaces corresponding to the aggregation levels. If the quantity of CCEs included in the control-resource set is 16, the aggregation levels of the search spaces included in the search space set are (4, 8, 16), and the quantities of candidate control channels included in the search spaces corresponding to the aggregation levels are respectively {4, 2, 1}; or if the quantity of CCEs included in the control-resource set is 8, the aggregation levels of the search spaces included in the search space set are {4, 8}, and the quantities of candidate control channels included in the search spaces corresponding to the aggregation levels are {2, 1}. This meets a condition that a quantity of CCEs included in a candidate control channel does not exceed a quantity of CCEs included in a control-resource set.

Certainly, in an actual application process, content included in the configuration information may be set according to an actual requirement. This is not specifically limited in this application.

Optionally, if the at least two candidate control channels include one or more same CCE indexes, the resources of the at least two candidate control channels overlap.

For example, it is assumed that resources of a candidate control channel 1, a candidate control channel 2, and a candidate control channel 3 and search spaces in which the candidate control channel 1, the candidate control channel 2, and the candidate control channel 3 are located are shown in Table 1.

TABLE 1

| Candidate control channel | Search space | Search space set | Resource |
| --- | --- | --- | --- |
| Candidate control channel 1 | Search space 1 | Search space set 1 | CCE 2 and CCE 3 |
| Candidate control channel 2 | Search space 2 | Search space set 2 | CCE 2 and CCE 3 |
| Candidate control channel 3 | Search space 3 | Search space set 2 | CCE 3 |

It can be learned from Table 1 that the candidate control channel 1, the candidate control channel 2, and the candidate control channel 3 are located in different search spaces.

The search space 1 and the search space 2 correspond to a same aggregation level, but are located in different search space sets. The search space 2 and the search space 3 correspond to different aggregation levels, but are located in a same search space set. In addition, the resources of the candidate control channel 1, the candidate control channel 2, and the candidate control channel 3 all include the CCE 3. In this case, the resources of the candidate control channel 1, the candidate control channel 2, and the candidate control channel 3 overlap.

Optionally, if the at least two candidate control channels include a same start CCE index, the resources of the at least two candidate control channels overlap.

Optionally, a start CCE index is a smallest CCE index or a largest CCE index in one or more CCE indexes included in a candidate control channel.

The start CCE index is a smallest CCE index in one or more CCE indexes included in a candidate control channel that are arranged in ascending order; or the start CCE index is a largest CCE index in one or more CCE indexes included in a candidate control channel that are arranged in descending order: or the start CCE index is a largest CCE index in one or more CCE indexes included in a candidate control channel that are arranged in ascending order; or the start CCE index is a smallest CCE index in one or more CCE indexes included in a candidate control channel that are arranged in descending order.

For example, it is assumed that resources of a candidate control channel 1, a candidate control channel 2, and a candidate control channel 3 and search spaces in which the candidate control channel 1, the candidate control channel 2, and the candidate control channel 3 are located are shown in Table 2.

TABLE 2

| Candidate control channel | Search space | Search space set | Resource |
| --- | --- | --- | --- |
| Candidate control channel 1 | Search space 1 | Search space set 1 | CCE 2 and CCE 3 |
| Candidate control channel 2 | Search space 2 | Search space set 2 | CCE 2 and CCE 3 |
| Candidate control channel 3 | Search space 3 | Search space set 2 | CCE 2 |

The candidate control channel 1 includes CCE indexes {CCE 2, CCE 3}, and a start CCE index of the candidate control channel 1 is the CCE 2. The candidate control channel 2 includes CCE indexes {CCE 2, CCE 3}, and a start CCE index of the candidate control channel 2 is the CCE 2. The candidate control channel 3 includes a CCE index {CCE 2}, and a start CCE index of the candidate control channel 3 is the CCE 2.

It can be learned from Table 2 that the candidate control channel 1, the candidate control channel 2, and the candidate control channel 3 are located in different search spaces. The search space 1 and the search space 2 correspond to a same aggregation level, but are located in different search space sets. The search space 2 and the search space 3 correspond to different aggregation levels, but are located in a same search space set. In addition, the start CCE indexes of the candidate control channel 1, the candidate control channel 2, and the candidate control channel 3 are all the CCE 2. In this case, it may be determined that the resources of the candidate control channel 1, the candidate control channel 2, and the candidate control channel 3 overlap.

Optionally, if a plurality of candidate control channels in different search space sets associated with a same control-resource set include a same CCE, resources of the plurality of candidate control channels including the same CCE overlap.

For example, the candidate control channel 1 in the search space set 1 includes {CCE 2, CCE 3}, the candidate control channel 2 in the search space set 2 includes {CCE 2, CCE 3}, and the search space set 1 and the search space set 2 are associated with a same control-resource set. Because both the candidate control channel 1 and the candidate control channel 2 include {CCE 2, CCE 3}, resources of the candidate control channel 1 and the candidate control channel 2 overlap.

Optionally, if a plurality of candidate control channels in different search space sets associated with a same control-resource set include a same start CCE, resources of the plurality of candidate control channels including the same CCE overlap.

For example, the candidate control channel 1 in the search space set 1 includes {CCE 4, CCE 5, CCE 6, CCE 7}, the candidate control channel 2 in the search space set 2 includes {CCE 4, CCE 5}, and the search space set 1 and the search space set 2 are associated with a same control-resource set. Because both start CCEs of the candidate control channel 1 and the candidate control channel 2 are the CCE 4, resources of the candidate control channel 1 and the candidate control channel 2 overlap.

S202: The terminal device detects only at least one first candidate control channel in the at least two candidate control channels.

Optionally, a quantity of the at least one first candidate control channel is less than a quantity of the at least two candidate control channels.

For example, the at least two candidate control channels whose resources are overlap include the candidate control channel 1, the candidate control channel 2, and the candidate control channel 3. For example, the three candidate control channels may be shown in Table 2. Payload sizes of control information carried on the foregoing three candidate control channels are the same, the candidate control channel 1 carries a DCI format 0_0 and a DCI format 1_0, and the candidate control channel 2 and the candidate control channel 3 carry a DCI format 0_1 and/or a DCI format 1_1. In addition, CRCs in the foregoing DCI formats are all scrambled by using a C-RNTI and/or a CS-RNTI. In this case, the terminal device detects only the candidate control channel 2 and the candidate control channel 3. The at least one first candidate control channel includes the candidate control channel 2 and the candidate control channel 3, in other words, includes two candidate control channels. Therefore, the quantity of the at least one first candidate control channel is less than the quantity of the at least two candidate control channels.

In an optional design, search spaces in which the at least two candidate control channels are located include a first-type search space and a second-type search space.

In this optional design, the type of a search space in which the at least one first candidate control channel is located is the first-type.

Further, optionally, the terminal device determines a candidate control channel that is in the at least two candidate control channels and that is located in the first-type search space as the at least one first candidate control channel.

Further, optionally, the at least two candidate control channels meet at least one of the following conditions:
  none of the at least two candidate control channels includes a carrier indicator field; and
  the at least two candidate control channels include a candidate control channel used for a first downlink control information format and a candidate control channel used for a second downlink control information format.

For example, the first-type search space is a common search space, and the second-type search space is a specific search space. A candidate control channel in the common search space is used to carry DCI in a fallback format, and a candidate control channel in the specific search space is used to carry DCI in a non-fallback format. In addition, a higher layer parameter may be used to configure that DCI in a non-fallback format in a serving cell (Serving cell) in which the terminal device is located does not include a cross-carrier indicator field. Further, as described above, none of the at least two candidate control channels includes a carrier indicator field, and downlink control information formats included in the at least two candidate control channels include DCI in a fallback format and DCI in a non-fallback format. The candidate control channel in the first downlink control information format is used to carry the DCI in the non-fallback format, and the candidate control channel in the second downlink control information format is used to carry the DCI in the fallback format.

For another example, the first-type search space is a common search space, and the second-type search space is a specific search space. A candidate control channel in the common search space is used to carry DCI in a fallback format, and a candidate control channel in the specific search space is also used to carry DCI in a fallback format. As described above, because the DCI in the fallback format does not include a cross-carrier indicator field, none of the at least two candidate control channels includes a carrier indicator field, and downlink control information formats included in the at least two candidate control channels are the same, in other words, each are DCI in a fallback format.

Optionally, the first-type search space is a common search space, and/or the second-type search space is a specific search space.

For example, it is assumed that the at least two candidate control channels include a candidate control channel 1, a candidate control channel 2, and a candidate control channel 3, and search spaces in which the candidate control channel 1, the candidate control channel 2, and the candidate control channel 3 are located are shown in Table 3.

TABLE 3

| Candidate control channel | Search space | Search space type | Carrier indicator field |
|---|---|---|---|
| Candidate control channel 1 | Search space 1 | Common search space | Excluded |
| Candidate control channel 2 | Search space 2 | Common search space | Excluded |
| Candidate control channel 3 | Search space 3 | Specific search space | Excluded |

It can be learned from Table 3 that the candidate control channel 1 and the candidate control channel 2 are located in common search spaces. In this case, the candidate control channel 1 and the candidate control channel 2 are determined as candidate control channels included in the at least one first candidate control channel. Neither a candidate control channel located in a common search space nor a candidate control channel located in a specific search space includes a carrier indicator field.

For another example, it is assumed that the at least two candidate control channels include a candidate control channel 1, a candidate control channel 2, and a candidate control channel 3, and search spaces in which the candidate control channel 1, the candidate control channel 2, and the candidate control channel 3 are located are shown in Table 4.

TABLE 4

| Candidate control channel | Search space | Search space type | Carrier indicator field |
|---|---|---|---|
| Candidate control channel 1 | Search space 1 | Common search space | Excluded |
| Candidate control channel 2 | Search space 2 | Common search space | Excluded |
| Candidate control channel 3 | Search space 3 | Specific search space | Included |

It can be learned from Table 4 that the candidate control channel 1 and the candidate control channel 2 are located in common search spaces. In this case, the candidate control channel 1 and the candidate control channel 2 are determined as candidate control channels included in the at least one first candidate control channel. A candidate control channel located in a common search space does not include a carrier indicator field, but a candidate control channel located in a specific search space includes a carrier indicator field.

Optionally, a candidate control channel that is in the at least two candidate control channels and that is located in the second-type search space is a subset of a candidate control channel that is in the at least two candidate control channels and that is located in the first-type search space.

For example, the first-type search space is a common search space, and the second-type search space is a specific search space. Resources of candidate control channels that are in the at least two candidate control channels and that are located in the common search space constitute a resource set 1, and resources of candidate control channels that are in the at least two candidate control channels and that are located in the specific search space constitute a resource set 2. In this case, the resource set 2 is a subset of the resource set 1. Optionally, the resource set 2 is a proper subset of the resource set 1.

Optionally, the search space in which the at least one first candidate control channel is located is the first-type search space or the second-type search space; and the at least one first candidate control channel is related to indexes of the at least two candidate control channels and/or at least one of indexes of search space sets in which the at least two candidate control channels are located.

In an optional implementation, the terminal device determines the at least one first candidate control channel based on the indexes of the at least two candidate control channels.

For example, if an index of a candidate control channel that is in the at least two candidate control channels and that is located in the second-type search space meets a first condition, the at least one first candidate control channel is a candidate control channel that is in the at least two candidate control channels and that is located in the second-type search space; otherwise, the at least one first candidate control channel is a candidate control channel that is in the at least two candidate control channels and that is located in the first-type search space.

The first condition may be that an index value is an even number or an odd number.

Further, optionally, in the at least two candidate control channels, a quantity of candidate control channels located in the second-type search space is not greater than a quantity of candidate control channels located in the first-type search space.

In another optional implementation, the terminal device determines the at least one first candidate control channel based on the at least one of the indexes of the search space sets in which the at least two candidate control channels are located.

Optionally, at least one of the indexes of the search space sets in which the at least two candidate control channels are located is a smallest index value, or the search space sets in which the at least two candidate control channels are located include an index of a search space set including a smallest quantity of candidate control channels.

In still another optional implementation, the terminal device determines the at least one first candidate control channel based on the indexes of the at least two candidate control channels and the at least one of the indexes of the search space sets in which the at least two candidate control channels are located. In this optional implementation, for specific explanations and implementations, refer to and combine the foregoing optional implementations.

In another optional design, a search space in which the at least one first candidate control channel is located is a second-type search space, each of the at least one first candidate control channel is used for a first downlink control information format, and search spaces in which the at least two candidate control channels are located each are the second-type search space.

Optionally, the at least two candidate control channels meet at least one of the following conditions:
none of the at least two candidate control channels includes a carrier indicator field;
the at least two candidate control channels include a candidate control channel used for the first downlink control information format and a candidate control channel used for a second downlink control information format; and
each of the at least two candidate control channels is used for the first downlink control information format.

For example, the second candidate control channels are all candidate control channel in specific search spaces, and downlink control information formats used by the candidate control channels in the specific search spaces for carrying each are DCI in a non-fallback format. In addition, a higher layer parameter may be used to configure that DCI in a non-fallback format in a serving cell (Serving cell) in which the terminal device is located does not include a cross-carrier indicator field. Further, as described above, none of the at least two candidate control channels includes a carrier indicator field. In addition, a downlink control information format used by each of the at least two candidate control channels for carrying is a non-fallback format.

For another example, the second candidate control channels are all candidate control channels in specific search spaces, and downlink control information format used by the candidate control channels in the specific search spaces include a non-fallback format and a fallback format. In addition, a higher layer parameter may be used to configure that DCI in a non-fallback format in a serving cell (Serving cell) in which the terminal device is located does not include a cross-carrier indicator field. Further, as described above, none of the at least two candidate control channels includes a carrier indicator field. In addition, the downlink control information formats included in the at least two candidate control channels include a fallback DCI format and a non-fallback DCI format. The candidate control channel in the first downlink control information format is used to carry the non-fallback DCI format, and the candidate control channel in the second downlink control information format is used to carry the fallback DCI format.

Optionally, the second-type search space is a specific search space.

Optionally, the first downlink control information format is a non-fallback format, and/or the second downlink control information format is a fallback format.

For example, it is assumed that the at least two candidate control channels include a candidate control channel 1, a candidate control channel 2, a candidate control channel 3, and a candidate control channel 4, and search spaces in which the candidate control channel 1, the candidate control channel 2, the candidate control channel 3, and the candidate control channel 4 are located are shown in Table 5.

TABLE 5

| Candidate control channel | Search space | Search space type | Downlink control information format |
|---|---|---|---|
| Candidate control channel 1 | Search space 1 | Specific search space | Fallback format |
| Candidate control channel 2 | Search space 2 | Specific search space | Fallback format |
| Candidate control channel 3 | Search space 3 | Specific search space | Non-fallback format |
| Candidate control channel 4 | Search space 4 | Specific search space | Non-fallback format |

It can be learned from Table 5 that the candidate control channel 1, the candidate control channel 2, the candidate control channel 3, and the candidate control channel 4 are all located in specific search spaces, and formats of control information carried on the candidate control channel 3 and the candidate control channel 4 are non-fallback formats. In this case, the at least one candidate control channel includes the candidate control channel 3 and the candidate control channel 4.

For example, it is assumed that the at least two candidate control channels include a candidate control channel 1, a candidate control channel 2, a candidate control channel 3, and a candidate control channel 4, and search spaces in which the candidate control channel 1, the candidate control channel 2, the candidate control channel 3, and the candidate control channel 4 are located are shown in Table 6.

TABLE 6

| Candidate control channel | Search space | Search space type | Downlink control information format | Carrier indicator field |
|---|---|---|---|---|
| Candidate control channel 1 | Search space 1 | Specific search space | Fallback format | Excluded |
| Candidate control channel 2 | Search space 2 | Specific search space | Fallback format | Excluded |
| Candidate control channel 3 | Search space 3 | Specific search space | Non-fallback format | Excluded |
| Candidate control channel 4 | Search space 4 | Specific search space | Non-fallback format | Excluded |

It can be learned from Table 6 that the candidate control channel 1, the candidate control channel 2, the candidate control channel 3, and the candidate control channel 4 are all located in specific search spaces, and formats of control information carried on the candidate control channel 3 and the candidate control channel 4 are non-fallback formats. In this case, the at least one candidate control channel includes the candidate control channel 3 and the candidate control channel 4. Neither of the at least one candidate control channel includes a carrier indicator field.

For example, it is assumed that the at least two candidate control channels include a candidate control channel 1, a candidate control channel 2, a candidate control channel 3, and a candidate control channel 4, and search spaces in which the candidate control channel 1, the candidate control channel 2, the candidate control channel 3, and the candidate control channel 4 are located are shown in Table 7.

TABLE 7

| Candidate control channel | Search space | Search space type | Downlink control information format | Carrier indicator field |
|---|---|---|---|---|
| Candidate control channel 1 | Search space 1 | Specific search space | Non-fallback format | Excluded |
| Candidate control channel 2 | Search space 2 | Specific search space | Non-fallback format | Excluded |
| Candidate control channel 3 | Search space 3 | Specific search space | Non-fallback format | Excluded |
| Candidate control channel 4 | Search space 4 | Specific search space | Non-fallback format | Excluded |

It can be learned from Table 7 that the candidate control channel 1, the candidate control channel 2, the candidate control channel 3, and the candidate control channel 4 are all located in specific search spaces, and formats of control information carried on the candidate control channel 1, the candidate control channel 2, the candidate control channel 3, and the candidate control channel 4 are all non-fallback formats. In this case, the at least one candidate control channel includes the candidate control channel 1, the candidate control channel 2, the candidate control channel 3, and the candidate control channel 4. None of the at least one candidate control channel includes a carrier indicator field.

Optionally, each of the at least one first candidate control channel includes a carrier indicator field.

The at least two candidate control channels meet at least one of the following conditions:
  only some of the at least two candidate control channels each include a carrier indicator field, or only some of the at least two candidate control channels each do not include a carrier indicator field;
  the at least two candidate control channels include the candidate control channel used for the first downlink control information format and the candidate control channel used for the second downlink control information format: and
  each of the at least two candidate control channels is used for the first downlink control information format.

For example, the second candidate control channels are all candidate control channels in specific search spaces, and downlink control information formats used by the candidate control channels in the specific search spaces for carrying include DCI in a non-fallback format and DCI in a fallback format. In addition, a higher layer parameter may be used to configure that DCI in a non-fallback format in a serving cell (Serving cell) in which the terminal device is located includes a cross-carrier indicator field. Further, as described above, a candidate control channel that is included in the at least two candidate control channels and that is used to carry DCI in a non-fallback format includes a carrier indicator field, and a candidate control channel that is included in the at least two candidate control channels and that is used to carry DCI in a fallback format does not include a carrier indicator field. The downlink control information formats included in the at least two candidate control channels include DCI in a fallback format and DCI in a non-fallback format. The candidate control channel in the first downlink control information format is used to carry the DCI in the non-fallback format, and the candidate control channel in the second downlink control information format is used to carry the DCI in the fallback format.

For another example, the second candidate control channels are all candidate control channels in specific search spaces, and downlink control information formats used by the candidate control channels in the specific search spaces for carrying each are DCI in a non-fallback format. The specific search spaces are located in different search space sets, that is, a search space set 1 and a search space set 2. In addition, a higher layer parameter may be used to configure that a candidate control channel in the search space set 1 in a serving cell (Serving cell) in which the terminal device is located includes a carrier indicator field, and a candidate control channel in the search space set 2 does not include a carrier indicator field. The downlink control information formats included in the at least two candidate control channels each are DCI in a non-fallback format. The candidate control channel in the first downlink control information format is used to carry the DCI in the non-fallback format.

Optionally, the second-type search space is a specific search space.

Optionally, the first downlink control information format is a non-fallback format, and/or the second downlink control information format is a fallback format.

For example, it is assumed that the at least two candidate control channels include a candidate control channel 1, a candidate control channel 2, a candidate control channel 3, and a candidate control channel 4, and search spaces in which the candidate control channel 1, the candidate control channel 2, the candidate control channel 3, and the candidate control channel 4 are located are shown in Table 8.

TABLE 8

| Candidate control channel | Search space | Search space type | Downlink control information format | Carrier indicator field |
|---|---|---|---|---|
| Candidate control channel 1 | Search space 1 | Specific search space | Fallback format | Excluded |
| Candidate control channel 2 | Search space 2 | Specific search space | Fallback format | Excluded |
| Candidate control channel 3 | Search space 3 | Specific search space | Non-fallback format | Included |
| Candidate control channel 4 | Search space 4 | Specific search space | Non-fallback format | Included |

It can be learned from Table 8 that the candidate control channel 1, the candidate control channel 2, the candidate control channel 3, and the candidate control channel 4 are all located in specific search spaces, and formats of control information carried on the candidate control channel 3 and the candidate control channel 4 are non-fallback formats. In this case, the at least one candidate control channel includes the candidate control channel 3 and the candidate control channel 4. Each of the at least one candidate control channel includes a carrier indicator field.

For example, it is assumed that the at least two candidate control channels include a candidate control channel 1, a candidate control channel 2, a candidate control channel 3, and a candidate control channel 4, and search space sets in which the candidate control channel 1, the candidate control channel 2, the candidate control channel 3, and the candidate control channel 4 are located are shown in Table 9.

TABLE 9

| Candidate control channel | Search space set | Search space type | Downlink control information format | Carrier indicator field |
|---|---|---|---|---|
| Candidate control channel 1 | Search space set 1 | Specific search space | Non-fallback format | Excluded |
| Candidate control channel 2 | Search space set 1 | Specific search space | Non-fallback format | Excluded |
| Candidate control channel 3 | Search space set 2 | Specific search space | Non-fallback format | Included |
| Candidate control channel 4 | Search space set 2 | Specific search space | Non-fallback format | Included |

It can be learned from Table 9 that the candidate control channel 1 and the candidate control channel 2 are located in the search space set 1; and the candidate control channel 3 and the candidate control channel 4 are located in the search space set 2. The candidate control channel 1 and the candidate control channel 2 each include a carrier indicator field; and neither of the candidate control channel 3 and the candidate control channel 4 includes a carrier indicator field. In this case, the at least one candidate control channel includes the candidate control channel 3 and the candidate control channel 4. Each of the at least one candidate control channel includes a carrier indicator field.

In still another optional design, search space in which the at least two candidate control channels are located each are the second-type search space, each of the at least one first candidate control channel is used for a second downlink control information format, and each of the at least two candidate control channels is used for the second downlink control information format.

Further, optionally, none of the at least two candidate control channels includes a carrier indicator field.

For example, the second candidate control channels are all candidate control channels in specific search spaces, and downlink control information formats used by the candidate control channels in the specific search spaces for carrying each are DCI in a fallback format. Further, as described above, none of the at least two candidate control channels includes a carrier indicator field. In addition, the downlink control information formats used by the at least two candidate control channels for carrying each are the fallback format.

Optionally, the second-type search space is a specific search space, and the second downlink control information format is a fallback format.

For example, it is assumed that the at least two candidate control channels include a candidate control channel 1, a candidate control channel 2, a candidate control channel 3, and a candidate control channel 4, and search spaces in which the candidate control channel 1, the candidate control channel 2, the candidate control channel 3, and the candidate control channel 4 are located are shown in Table 10.

TABLE 10

| Candidate control channel | Search space | Search space type | Downlink control information format | Carrier indicator field |
|---|---|---|---|---|
| Candidate control channel 1 | Search space 1 | Specific search space | Fallback format | Excluded |
| Candidate control channel 2 | Search space 2 | Specific search space | Fallback format | Excluded |
| Candidate control channel 3 | Search space 3 | Specific search space | Fallback format | Excluded |
| Candidate control channel 4 | Search space 4 | Specific search space | Fallback format | Excluded |

It can be learned from Table 10 that the candidate control channel 1, the candidate control channel 2, the candidate control channel 3, and the candidate control channel 4 are all located in specific search spaces, and formats of control information carried on the candidate control channel 1, the candidate control channel 2, the candidate control channel 3, and the candidate control channel 4 are all fallback formats. In this case, the at least one candidate control channel includes all the candidate control channels. None of the at least one candidate control channel includes a carrier indicator field.

In yet another optional design, a search space in which the at least one first candidate control channel is located is a second-type search space.

Optionally, only some of the at least one first candidate control channel each include a carrier indicator field, or only some of the at least one first candidate control channel each do not include a carrier indicator field.

Further, optionally, a candidate control channel included in the at least one first candidate control channel is determined based on a search space index.

For example, search space sets in which the at least two candidate channels are located include a search space set 1, a search space set 2, a search space set 3, and a search space set 4. An index of the search space set 1 is 1, an index of the search space set 2 is 2, an index of the search space set 3 is 3, and an index of the search space set 4 is 4. None of candidate control channels in the search space set 1 and the search space set 2 includes a carrier indicator field, and candidate control channels in the search space set 3 and the search space set 4 each include a carrier indicator field. In search space sets that each do not include a carrier indicator field, a search space set having a smallest search space set index is the search space set 1. In search space sets that each include a carrier indicator field, a search space set having a smallest search space set index is the search space set 3. In this case, the at least one first candidate control channel includes the candidate control channels in the search space set 1 and/or the search space set 3.

In this embodiment of this application, the terminal device does not detect a candidate control channel other than the at least one first candidate control channel in the at least two candidate control channels.

For example, it is assumed that search spaces configured for the terminal device include at least a search space 1 and a search space 2 shown in Table 11.

TABLE 11

| Search space | Candidate control channel | Resource |
|---|---|---|
| Search space 1 (common search space) | Candidate control channel 1 | CCE 0 and CCE 1 |
| | Candidate control channel 2 | CCE 2 and CCE 3 |
| | Candidate control channel 3 | CCE 4 and CCE 5 |
| Search space 2 (specific search space) | Candidate control channel 4 | CCE 4 |
| | Candidate control channel 5 | CCE 6 |
| | Candidate control channel 6 | CCE 7 |

It can be learned from Table 11 that resources of the candidate control channel 3 in the search space 1 and the candidate control channel 4 in the search space 2 overlap. Because the search space 1 is a common search space, the candidate control channel 3 may be determined as a candidate control channel in the at least one first candidate control channel. Correspondingly, the terminal device detects the candidate control channel 1, the candidate control channel 2, and the candidate control channel 3 in the search space 1, and the terminal device detects the candidate control channel 5 and the candidate control channel 6 in the search space 2. In other words, the terminal device does not detect the candidate control channel 4 in the search space 2.

Optionally, a search space in which the at least one first candidate control channel is located is a common search space, a start resource block of a data channel scheduled through a first candidate control channel in the at least one first candidate control channel is a start resource block in a control-resource set, and the control-resource set is a control-resource set associated with a search space set in which the first candidate control channel is located; or a start resource block of a data channel scheduled through a first candidate control channel in the at least one first candidate control channel is a start resource block in an initial bandwidth part.

In yet another optional design, the terminal device detects one or more second control channels in the at least one first candidate control channel.

Case 1: The terminal device detects only one second control channel, and if a search space in which the second control channel is located is the first-type search space, the terminal device determines that a start resource block of a data channel scheduled through the second control channel is a start resource block in a control-resource set, and the control-resource set is a control-resource set associated with a search space set in which the second control channel is located; or if a search space in which the second control channel is located is the second-type search space, the terminal device determines that a start resource block of a data channel scheduled through the second control channel is a start resource block in a bandwidth part, and the bandwidth part is a bandwidth part indicated by the second control channel. Optionally, the bandwidth part is a frequency domain resource that is configured by a network device and that is used by the terminal device to receive and/or send data.

Case 2: The terminal device detects a plurality of second control channels. For any one of the plurality of second control channels:
- if a search space in which the second control channel is located is the first-type search space, a start resource block of a data channel scheduled through the second control channel is a start resource block in a control-resource set, and the control-resource set is a control-resource set associated with a search space set in which the second control channel is located; or
- if a search space in which the second control channel is located is the second-type search space, a start resource block of a data channel scheduled through the second control channel is a start resource block in a bandwidth part, and the bandwidth part is a bandwidth part indicated by the second control channel.

For example, the network device configures that a frequency domain position of a control-resource set associated with the common search space is in a bandwidth part (BWP for short). Indexes of resource blocks (RB for short) included in the bandwidth part are consecutive RB index values: {RB 3, RB 4, RB 5 . . . , RB 18, RB 19, RB 20}; and indexes of RBs included in the control-resource set are {RB 6, RB 7, RB 8, . . . , RB 15, RB 16, RB 17}. A smallest value of the indexes of the RBs included in the control-resource set is the RB 6, the terminal device detects downlink control information in the common search space. A start RB index that is of a frequency domain area of an uplink or downlink shared channel and that is indicated by the downlink control information is the RB 6. The foregoing RB indexes are RB indexes in a common index area. The smallest RB index in frequency domain may be indicated by the downlink control information.

For another example, a start resource block of a data channel scheduled through the second control channel is a start resource block in an initial bandwidth part. The network device configures that a frequency domain position of a control-resource set associated with the common search space is in a bandwidth part, and configures an initial bandwidth part (Initial BWP). Indexes of RBs included in the bandwidth part are consecutive RB index values: {RB 3, RB 4, RB 5, . . . , RB 18, RB 19, RB 20}, and indexes of RBs included in the initial bandwidth part are (RB 5, RB 6, RB 7, RB 8, . . . , RB 15, RB 16, RB 17). The initial bandwidth part and the bandwidth part overlap, and a smallest value of the indexes of the included RBs is the RB 5. The terminal device detects downlink control information in the common search space. A start RB index that is of a frequency domain area of an uplink or downlink shared channel and that is indicated by the downlink control information is the RB 5. The foregoing RB indexes are RB indexes in the common index area. The smallest RB index in frequency domain may be indicated by the downlink control information. Optionally, the search space in which the second control channel is located is the specific search space, the start resource block of the data channel scheduled through the second control channel is a start resource block in a bandwidth part, and the bandwidth part is a bandwidth part indicated by the second control channel.

For another example, the network device configures a bandwidth part 1, and indexes of RBs included in the bandwidth part 1 are consecutive RB index values: {RB 3, RB 4, RB 5, . . . , RB 18. RB 19. RB 20}. The terminal device detects downlink control information, and a bandwidth part indicated by the downlink control information is the bandwidth part 1. In this case, a start RB index in a frequency domain area of an uplink or downlink shared channel scheduled through the downlink control information is the RB 3.

In this embodiment of this application, the at least two candidate control channels meet at least one of the following conditions:

CRCs of the at least two candidate control channels are scrambled by using a C-RNTI and/or a CS-RNTI;
the search spaces in which the at least two candidate control channels are located are located on a same component carrier or different component carriers;
the at least two candidate control channels include a same start control channel element index; and
the at least two candidate control channels have a same payload size.

It should be noted that the term "start resource block" described in the embodiments of the present invention may mean a corresponding resource block having a smallest subcarrier sequence number in resource blocks included in a specific area (for example, a common index area or a bandwidth part), or a resource block having a smallest sequence number in included resource blocks that are numbered in a low-to-high frequency direction, or a corresponding resource block having a largest subcarrier sequence number in resource blocks included in a specific area (for example, a common index area or a bandwidth part), or a resource block having a largest sequence number in included resource blocks that are numbered in a low-to-high frequency direction. The low frequency and the high frequency are defined in relative to a subcarrier sequence number. A low-frequency subcarrier sequence number is less than a high-frequency subcarrier sequence number. No specific limitation is imposed in the embodiments. A specific start resource block depends on an actual requirement of a communications system, a notification from the network device, or a stipulation in a standard or a protocol.

According to the control channel detection method, when the terminal device determines that the resources of the at least two candidate control channels located in the different search spaces overlap, the terminal device detects only the at least one first candidate control channel in the at least two candidate control channels, so that the terminal device can determine a format of a detected control channel, and then the terminal device can correctly parse the detected control channel based on the format of the control channel. This improves control channel detection reliability.

On the basis of the embodiment shown in FIG. 2, a specific manner in which a terminal device detects a control channel is shown below by using an embodiment shown in FIG. 3. It should be noted that the method shown in the embodiment in FIG. 3 is merely an example of the manner in which a terminal device detects a control channel, and does not limit the manner in which a terminal device detects a control channel.

Figure 3:
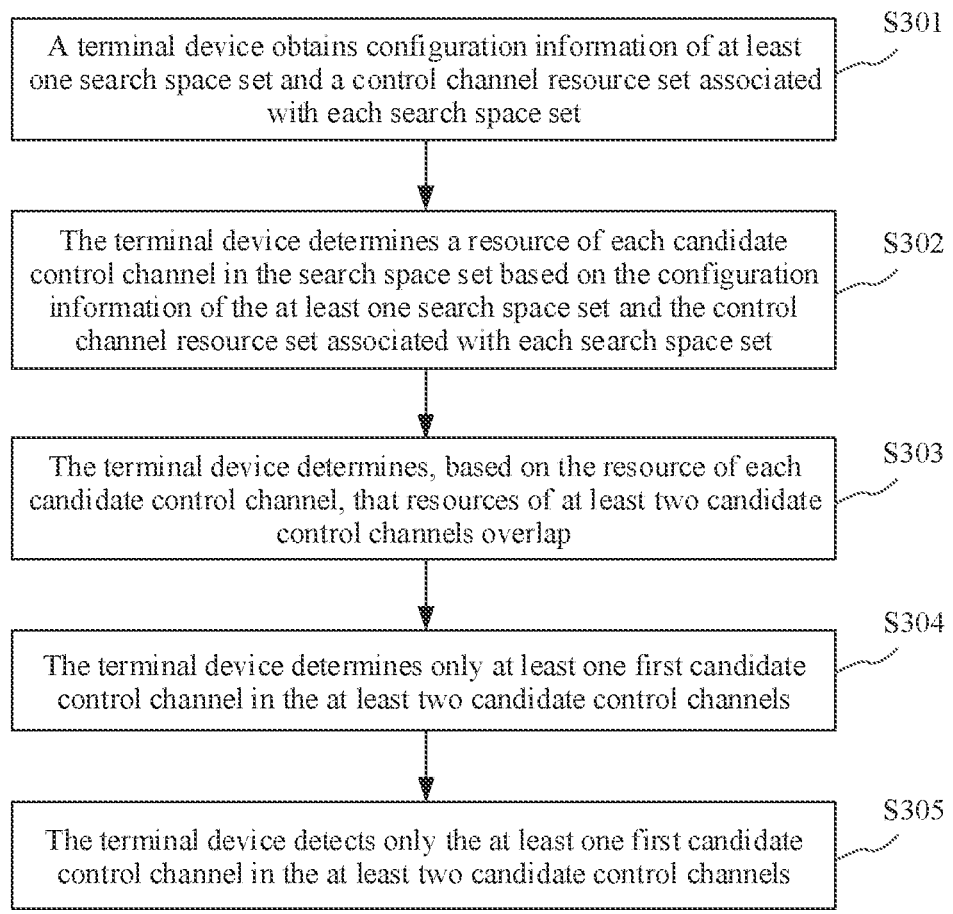
FIG. 3 is a schematic flowchart of another control channel detection method according to this application.

FIG. 3 is a schematic flowchart of another control channel detection method according to this application. Referring to FIG. 3, the method may include the following steps.

S301: A terminal device obtains configuration information of at least one search space set.

Optionally, configuration information of one search space set may include a format of control information carried on a candidate control channel in the search space set, an aggregation level of a search space included in the search space set, a quantity of candidate control channels included in a search space corresponding to each aggregation level, a search space set type (for example, a common search space set or a specific search space set), an index of an associated control-resource set, and the like.

Certainly, in an actual application process, content included in the configuration information may be set according to an actual requirement. This is not specifically limited in this application.

Optionally, the control channel resource set associated with the search space set may be a CCE set associated with the search space set.

Optionally, different search space sets may be associated with a same control channel resource set.

S302: The terminal device determines a resource of each candidate control channel in the search space set based on the configuration information of the at least one search space set and the control channel resource set associated with each search space set.

Optionally, for a candidate control channel in any search space set, a resource of the candidate control channel may be determined based on an aggregation level (a quantity of consecutive CCEs occupied by the candidate control channel), a control channel resource set associated with the search space set, and a preset resource allocation manner.

Optionally, a CCE index of the candidate control channel may be determined, and a CCE indicated by the CCE index is a resource of the candidate control channel.

Optionally, resources of different candidate control channels in one search space do not overlap.

Optionally, when different search space sets are associated with control channel resource sets in which time-frequency resources do not overlap, resources of candidate control channels in the different search space sets do not overlap. When different search space sets are associated with a same control channel resource set, resources of candidate control channels in the different search space sets may overlap.

Optionally, resources of candidate control channels in different search spaces in one search space set may overlap.

S303: The terminal device determines, based on the resource of each candidate control channel, that resources of at least two candidate control channels overlap.

Any two of the at least two candidate control channels are located in different search spaces.

Optionally, the at least two candidate control channels may be located in a same search space set or different search space sets.

Optionally, when the at least two candidate control channels are located in different search space sets, the different search space sets are associated with a same control channel resource set.

Optionally, if CCE indexes of at least two candidate control channels in different search spaces overlap, it is determined that resources of the at least two candidate control channels overlap.

Optionally, if start CCE indexes of at least two candidate control channels in different search spaces are the same, it is determined that resources of the at least two candidate control channels overlap.

It should be noted that, for a process of performing S303, refer to S201, and details are not described herein again.

S304: The terminal device determines at least one first candidate control channel in the at least two candidate control channels.

S305: The terminal device detects only the at least one first candidate control channel in the at least two candidate control channels.

It should be noted that, for a process of performing S304 and S305, refer to S202, and details are not described herein again.

In the embodiment shown in FIG. 3, when the terminal device determines that the resources of the at least two candidate control channels located in the different search spaces overlap, the terminal device detects only the at least one first candidate control channel in the at least two candidate control channels, to prevent the terminal device from detecting candidate control channels in two search spaces on a same resource, so that the terminal device can correctly parse a received control channel. This improves control channel detection reliability.

On the basis of the embodiments shown in FIG. 2 and FIG. 3, the network device sends a control channel in the following feasible implementation. For details, refer to an embodiment shown in FIG. 4.

Figure 4:
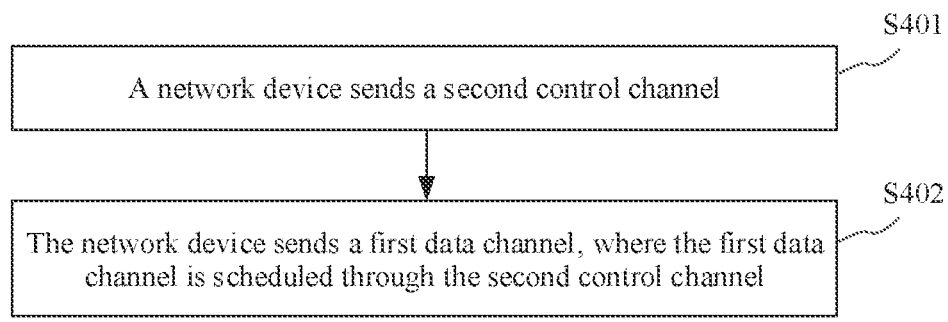
FIG. 4 is a schematic flowchart of still another control channel detection method according to this application.

FIG. 4 is a schematic flowchart of still another control channel detection method according to this application. Referring to FIG. 4, the method may include the following steps.

S401: A network device sends a second control channel.

The second control channel is a control channel in at least two candidate control channels, resources of the at least two candidate control channels overlap, and any two of the at least two candidate control channels are located in different search spaces.

Optionally, the network device does not send a candidate control channel other than at least one first candidate control channel in the at least two candidate control channels. The second control channel is a control channel in the at least one first candidate control channel.

Optionally, before the network device sends the second control channel, the network device may first determine the at least one first candidate control channel, and determine not to send the candidate control channel other than the at least one first candidate control channel in the at least two candidate control channels.

Optionally, the network device may detect, based on a search space set configured for one terminal device and a control channel resource set associated with the search space set, resources of candidate control channels in the search space set configured for the terminal device, to determine whether resources of at least two candidate control channels located in different search spaces overlap. When the network device determines that the resources of the at least two candidate control channels located in the different search spaces overlap, the network device may determine at least one first candidate control channel in the at least two candidate control channels in a preset manner.

Optionally, the network device determines the at least one first candidate control channel, and further determines the second control channel in the at least one first candidate control channel.

It should be noted that the preset manner is the same as the manner in which the terminal device determines at least one first candidate control channel in at least two candidate control channels in the embodiment in FIG. 2.

Optionally, the network device may send the second control channel on an overlapping resource of the at least two candidate control channels.

For example, it is assumed that search spaces configured by the network device for the terminal device include at least a search space 1 and a search space 2 shown in Table 12.

TABLE 12

| Search space | Candidate control channel | Resource |
| --- | --- | --- |
| Search space 1 (common search space) | Candidate control channel 1 | CCE 0 and CCE 1 |
| | Candidate control channel 2 | CCE 2 and CCE 3 |
| | Candidate control channel 3 | CCE 4 and CCE 5 |
| Search space 2 (specific search space) | Candidate control channel 4 | CCE 5 |
| | Candidate control channel 5 | CCE 6 |
| | Candidate control channel 6 | CCE 7 |

According to the method shown in the embodiment in FIG. 2, it may be determined that the at least two candidate control channels include the candidate control channel 3 and the candidate control channel 4, and the at least one first candidate control channel in the at least two candidate control channels includes the candidate control channel 3. In this case, the network device may send the candidate control channel 3 on the CCE 5, and does not send the candidate control channel 4 on the CCE 5. In this way, the terminal device can detect only the candidate control channel 3 on the CCE 5, so that the terminal device can correctly parse the candidate control channel (the candidate control channel 3) detected on the CCE 5.

Optionally, search spaces in which the at least two candidate control channels are located include a first-type search space and a second-type search space.

Optionally, the type of a search space in which the at least one first candidate control channel is located is the first-type.

The at least two candidate control channels meet at least one of the following conditions:
 none of the at least two candidate control channels includes a carrier indicator field; and
 the at least two candidate control channels include a candidate control channel used for a first downlink control information format and a candidate control channel used for a second downlink control information format.

Optionally, the first-type search space may be a common search space.

Optionally, the first downlink control information format is a non-fallback format.

Optionally, the second downlink control information format is a fallback format.

Optionally, the search space in which the at least one first candidate control channel is located is the first-type search space or the second-type search space.

The at least one first candidate control channel is related to indexes of the at least two candidate control channels and/or at least one of indexes of search space sets in which the at least two candidate control channels are located.

Optionally, a search space in which the at least one first candidate control channel is located is a second-type search space, search spaces in which the at least two candidate control channels are located each are the second-type search space, and each of the at least one first candidate control channel is used for a first downlink control information format.

Optionally, the second-type search space may be a specific search space.

Optionally, the at least two candidate control channels meet at least one of the following conditions:
  none of the at least two candidate control channels includes a carrier indicator field;
  the at least two candidate control channels include a candidate control channel used for the first downlink control information format and a candidate control channel used for a second downlink control information format: and
  each of the at least two candidate control channels is used for the first downlink control information format.

Optionally, each of the at least one first candidate control channel includes a carrier indicator field.

The at least two candidate control channels meet at least one of the following conditions:
  only some of the at least two candidate control channels each include a carrier indicator field, or only some of the at least two candidate control channels each do not include a carrier indicator field;
  the at least two candidate control channels include the candidate control channel used for the first downlink control information format and the candidate control channel used for the second downlink control information format: and
  each of the at least two candidate control channels is used for the first downlink control information format.

Optionally, a search space in which the at least one first candidate control channel is located is a second-type search space.

Only some of the at least one first candidate control channel each include a carrier indicator field, or only some of the at least one first candidate control channel each do not include a carrier indicator field.

Optionally, the at least two candidate control channels may meet any one or more of the following conditions:
  the search spaces in which the at least two candidate control channels are located are located on a same component carrier or different component carriers;
  the at least two candidate control channels include a same start control channel element index;
  the at least two candidate control channels have a same payload size; and
  cyclic redundancy codes CRC of the at least two control channels are scrambled by using a C-RNTI or a CS-RNTI.

It should be noted that, for specific descriptions of the foregoing optional implementations, refer to the embodiment shown in FIG. 2. Details are not described herein again.

S402: The network device sends a first data channel, where the first data channel is scheduled through the second control channel.

Optionally, when a search space in which the second control channel is located is the first-type search space, a start resource block of the first data channel is a start resource block in a control-resource set, and the control-resource set is a control-resource set associated with a search space set in which the second control channel is located.

Optionally, when a search space in which the second control channel is located is the second-type search space, a start resource block of the first data channel is a start resource block in a bandwidth part, and the bandwidth part is a bandwidth part indicated by the second control channel.

In the embodiment shown in FIG. 4, when the network device determines that the resources of the at least two candidate control channels located in the different search spaces overlap, the network device does not send the candidate control channel other than the at least one first candidate control channel in the at least two candidate control channels, so that the terminal device can determine a format of a detected control channel, and then the terminal device can correctly parse the received control channel. This improves control channel detection reliability.

On the basis of any one of the foregoing embodiments, optionally, a plurality of candidate control channels in a first search space in at least two search spaces all include overlapping resources, and the overlapping resources are different.

For example, a search space 1 includes a candidate control channel 1 and a candidate control channel 2. The candidate control channel 1 includes {CCE 2, CCE 3}, and the candidate control channel 2 includes (CCE 8, CCE 9. The CCE 2 in the candidate control channel 1 is the same as a CCE included in another candidate control channel, and the CCE 8 in the candidate control channel 2 is the same as a CCE included in another candidate control channel. The overlapping resources CCE 2 and CCE 8 are different.

Optionally, a plurality of candidate control channels in a first search space in at least two search spaces all include overlapping resources, and the at least two candidate control channels include the plurality of candidate control channels in the first search space.

For example, a search space 1 includes a candidate control channel 1 and a candidate control channel 2. The candidate control channel 1 includes {CCE 2, CCE 3}, and the candidate control channel 2 includes {CCE 8, CCE 9}. The CCE 2 in the candidate control channel 1 is the same as a CCE included in another candidate control channel, and the CCE 8 in the candidate control channel 2 is the same as a CCE included in another candidate control channel. The at least two candidate control channels include the candidate control channel 1 and the candidate control channel 2 in a search space set 1.

Optionally, a plurality of candidate control channels in a first search space in at least two search spaces all include overlapping resources, the at least two candidate control channels include the plurality of candidate control channels in the first search space, and the at least one first candidate control channel in the at least two candidate control channels includes a first part of candidate control channels and a second part of candidate control channels. Search spaces in which the first part of candidate control channels are located each are the first-type search space, and search spaces in which the second part of candidate control channels are located each are the second-type search space.

Optionally, the first-type search space is a common search space, and the second-type search space is a specific search space.

The following describes the first part of candidate control channels and the second part of candidate control channels in detail by using specific examples.

For example, it is assumed that search spaces configured for the terminal device include at least a search space 1 and a search space 2 shown in Table 13.

TABLE 13

| Search space | Carried control information format | Candidate control channel | Candidate control channel index | Resource |
|---|---|---|---|---|
| Search space 1 (common search space) | Fallback format | Candidate control channel 1 | 0 | CCE 0 and CCE 1 |
|  |  | Candidate control channel 2 | 1 | CCE 2 and CCE 3 |
|  |  | Candidate control channel 3 | 2 | CCE 4 and CCE 5 |
| Search space 2 (specific search space) | Fallback format or non-fallback format | Candidate control channel 4 | 0 | CCE 0 |
|  |  | Candidate control channel 5 | 1 | CCE 2 |
|  |  | Candidate control channel 6 | 2 | CCE 4 |

An index of a candidate control channel is an index of the candidate control channel in a search space. The terminal device may determine, based on the index of the candidate control channel, a CCE included in the candidate control channel.

It can be learned from Table 13 that resources of both the candidate control channel 1 and the candidate control channel 4 include the CCE 0, resources of both the candidate control channel 2 and the candidate control channel 5 include the CCE 2, and resources of both the candidate control channel 3 and the candidate control channel 6 include the CCE 4.

Optionally, the first part of candidate control channels and/or the second part of candidate control channels are determined based on candidate control channel indexes.

In a possible manner, the first part of candidate control channels are determined based on candidate control channel indexes.

For example, in the candidate control channels including the overlapping resources in the search space 1, candidate control channels having even-numbered candidate control channel indexes are the first part of candidate control channels, and the candidate control channels having even-numbered indexes in the search space 1 are the candidate control channel 1 and the candidate control channel 3. In this case, the first part of candidate control channels include the candidate control channel 1 and the candidate control channel 3. Correspondingly, the second part of candidate control channels include the candidate control channel 5.

In this case, the terminal device detects the candidate control channel 1 and the candidate control channel 3 in the search space 1, and the terminal device detects the candidate control channel 5 in the search space 2.

For another example, in the candidate control channels including the overlapping resources in the search space 1, a candidate control channel having an odd-numbered candidate control channel index is the first part of candidate control channels, and the candidate control channel having an odd-numbered index in the search space 1 is the candidate control channel 2. In this case, the first part of candidate control channels include the candidate control channel 2. Correspondingly, the second part of candidate control channels include the candidate control channel 4 and the candidate control channel 6.

In this case, the terminal device detects the candidate control channel 2 in the search space 1, and the terminal device detects the candidate control channel 4 and the candidate control channel 6 in the search space 2.

In another possible manner, the second part of candidate control channels are determined based on candidate control channel indexes.

For example, in the candidate control channels including the overlapping resources in the search space 2, candidate control channels having even-numbered candidate control channel indexes are the second part of candidate control channels, and the candidate control channels having even-numbered indexes in the search space 2 are the candidate control channel 4 and the candidate control channel 6. In this case, the second part of candidate control channels include the candidate control channel 4 and the candidate control channel 6. Correspondingly, the first part of candidate control channels include the candidate control channel 2.

In this case, the terminal device detects the candidate control channel 2 in the search space 1, and the terminal device detects the candidate control channel 4 and the candidate control channel 6 in the search space 2.

For another example, in the candidate control channels including the overlapping resources in the search space 2, a candidate control channel having an odd-numbered candidate control channel index is the second part of candidate control channels, and the candidate control channel having an odd-numbered index in the search space 2 is the candidate control channel 5. In this case, the second part of candidate control channels include the candidate control channel 5. Correspondingly, the first part of candidate control channels include the candidate control channel 1 and the candidate control channel 3.

In this case, the terminal device detects the candidate control channel 1 and the candidate control channel 3 in the search space 1, and the terminal device detects the candidate control channel 5 in the search space 2.

In another possible manner, the first part of candidate control channels and the second part of candidate control channels are determined based on candidate control channel indexes, which is described above.

Optionally, control information carried on the second part of candidate control channels is in a first format.

Optionally, the second-type search space in which the at least two candidate control channels are located includes a plurality of search spaces.

Optionally, the at least two candidate control channels include any candidate control channel in the second-type search space.

Optionally, an index of a search space set in which the second part of candidate control channels are located is a smallest value of indexes of search space sets included in the second-type search space. For example, as shown in Table 14, candidate control channels included in a search space 1, a search space 2, and a search space 3 all include overlapping resources, and the candidate control channels including the overlapping resources include {candidate control channel 1, candidate control channel 2, candidate control channel 3, candidate control channel 4, candidate control channel 5, candidate control channel 6, candidate control channel 7, candidate control channel 8, candidate control channel 9}. The second part of candidate control channels are determined only from candidate control channels included in a search space set having a smallest search space set index. The second-type search space includes the search space 2 and the search space 3, an index of a search space set in which the search space 2 is located is 2, an index of a search space set in which the search space 3 is located is 3, and a search space having a smallest search space set index is the search space 2. In this case, the second part of candidate control channels are determined from candidate control channels in the search space 2. For a specific determining method, refer to the foregoing method for performing determining based on a candidate control channel index.

TABLE 14

| Search space | Search space set index | Carried control information format | Candidate control channel | Resource |
|---|---|---|---|---|
| Search space 1 (common search space) | 0 | Fallback format | Candidate control channel 1 | CCE 0 and CCE 1 |
| | | | Candidate control channel 2 | CCE 2 and CCE 3 |
| | | | Candidate control channel 3 | CCE 4 and CCE 5 |
| Search space 2 (specific search space) | 1 | Fallback format | Candidate control channel 4 | CCE 0 |
| | | | Candidate control channel 5 | CCE 2 |
| | | | Candidate control channel 6 | CCE 4 |
| Search space 3 (specific search space) | 2 | Non-fallback format | Candidate control channel 7 | CCE 0 and CCE 1 |
| | | | Candidate control channel 8 | CCE 2 and CCE 3 |
| | | | Candidate control channel 9 | CCE 4 and CCE 5 |

Optionally a search space in which the second part of candidate control channels are located is a search space having a largest quantity of candidate control channels in the search spaces included in the second-type search space.

For example, as shown in Table 15, candidate control channels included in a search space 1, a search space 2 and a search space 3 all include overlapping resources, and the candidate control channels including the overlapping resources include (candidate control channel 1, candidate control channel 2, candidate control channel 3, candidate control channel 4, candidate control channel 5, candidate control channel 6, candidate control channel 7 candidate control channel 8, candidate control channel 9, candidate control channel 10). The second part of candidate control channels are determined only from a search space including a largest quantity of candidate control channels. The second-type search space includes the search space 2 and the search space 3, and a quantity of candidate control channels included in the search space 3 is 4 and is greater than a quantity of candidate control channels included in the search space 2. In this case, the second part of candidate control channels are determined from candidate control channels in the search space 3. For a specific determining method, refer to the foregoing method for performing determining based on a candidate control channel index.

TABLE 15

| Search space | Search space set index | Carried control information format | Candidate control channel | Resource |
|---|---|---|---|---|
| Search space 1 (common search space) | 0 | Fallback format | Candidate control channel 1 | CCE 0 and CCE 1 |
| | | | Candidate control channel 2 | CCE 2 and CCE 3 |
| | | | Candidate control channel 3 | CCE 4 and CCE 5 |

TABLE 15-continued

| Search space | Search space set index | Carried control information format | Candidate control channel | Resource |
|---|---|---|---|---|
| Search space 2 (specific search space) | 1 | Fallback format | Candidate control channel 4 | CCE 0 and CCE 1 |
| | | | Candidate control channel 5 | CCE 2 and CCE 3 |
| | | | Candidate control channel 6 | CCE 4 and CCE 5 |
| Search space 3 (specific search space) | 2 | Non-fallback format | Candidate control channel 7 | CCE 0 |
| | | | Candidate control channel 8 | CCE 1 |
| | | | Candidate control channel 9 | CCE 2 |
| | | | Candidate control channel 10 | CCE 3 |

Optionally, a stat resource block of a data channel scheduled through each of the first part of candidate control channels is a lowest-position resource block in a control-resource set, and the control-resource set is a control-resource set associated with a search space set in which the candidate control channel is located.

Optionally, a start resource block of a data channel scheduled through each of the first part of candidate control channels is a lowest-position resource block in a bandwidth part, and the bandwidth part is a bandwidth part indicated by the candidate control channel.

Optionally, the bandwidth part is a bandwidth part in which the data channel is located.

Optionally, the lowest-position resource block may be a start resource block in a low-to-high direction in frequency domain, or a resource having a smallest (or lowest) resource block index.

When resources of candidate control channels in at least two search spaces partially overlap, the foregoing method not only can ensure that the terminal device detects only candidate control channels in one search space on a same resource, but also can ensure that candidate control channels in a plurality of search spaces are all detected.

On the basis of any one of the foregoing embodiments, this application further provides a communication method. For details, refer to an embodiment shown in FIG. 5.

Figure 5:
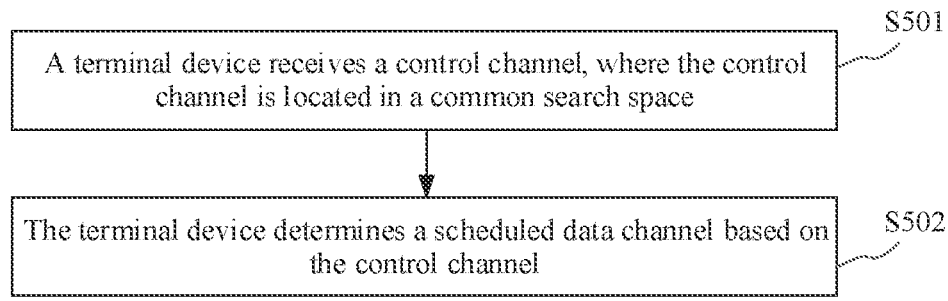
FIG. 5 is a schematic flowchart of a communication method according to this application.

FIG. 5 is a schematic flowchart of a communication method according to this application. Referring to FIG. 5, the method may include the following steps.

S501: A terminal device receives a control channel, where the control channel is located in a common search space.

Optionally, the terminal device may perform channel detection in the common search space, to detect the control channel.

S502: The terminal device determines a scheduled data channel based on the control channel.

Optionally, after receiving the control channel, the terminal device may obtain control information and a control channel CRC scrambling codeword from the control channel, and determine the scheduled data channel based on the control information and the scrambling codeword.

Optionally, the control information may be downlink control information.

Optionally, the control channel CRC scrambling codeword may include a C-RNTI, an SI-RNTI, a P-RNTI, a CS-RNTI, an RA-RNTI, and the like.

For example, if a CRC of the control channel detected by the terminal device is scrambled by using a C-RNTI and/or a CS-RNTI, a start resource block of the data channel scheduled through the control channel is a start resource block in a bandwidth part (BWP), and the bandwidth part is a bandwidth part indicated by a first candidate control channel.

Optionally, if a CRC of the control channel detected by the terminal device is scrambled by using a first RNTI, a start resource block of the data channel scheduled through the control channel is a start resource block in a control-resource set, or a start resource block of the data channel scheduled through the control channel is a width of a start resource in an initial bandwidth part.

Optionally, the first RNTI is an RNTI that does not include at least a C-RNTI and/or a CS-RNTI.

For example, if a CRC of the control channel detected by the terminal device is scrambled by using an SI-RNTI or a CRC of the control channel is scrambled by using a P-RNTI, a start resource block of the data channel scheduled through the control channel is a start resource block in a control-resource set, and the control-resource set is a control-resource set associated with a search space set in which the control channel is located; or a start resource block of the data channel scheduled through the control channel is a width of a start resource in an initial bandwidth part.

Optionally, if a CRC of the control channel detected by the terminal device is scrambled by using a second RNTI, a start resource block of the data channel scheduled through the control channel is a start resource block in a bandwidth part (BWP), and the bandwidth part is a bandwidth part indicated by a first candidate control channel.

Optionally, the second RNTI is a C-RNTI and/or a CS-RNTI.

For example, if a CRC of the control channel detected by the terminal device is scrambled by using a C-RNTI and/or a CS-RNTI, a start resource block of the data channel scheduled through the control channel is a start resource block in a bandwidth part (BWP), and the bandwidth part is a bandwidth part indicated by a first candidate control channel.

Figure 6:
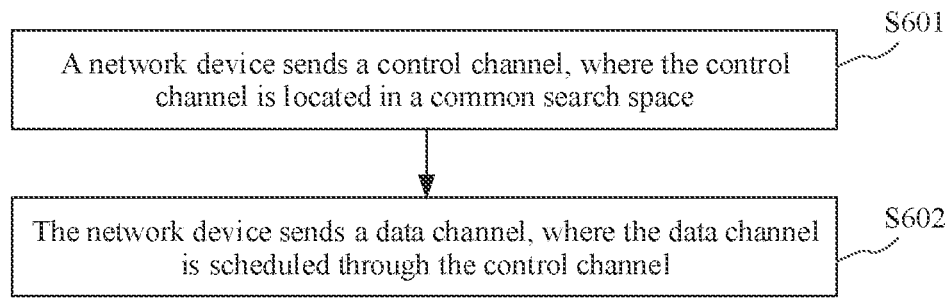
FIG. 6 is a schematic flowchart of another communication method according to this application.

FIG. 6 is a schematic flowchart of another communication method according to this application. Referring to FIG. 6, the method may include the following steps.

S601: A network device sends a control channel, where the control channel is located in a common search space.

Optionally, the network device may send the control channel in the common search space.

Optionally, the control channel may include control information and a control channel CRC scrambling codeword.

Optionally, the control information may be downlink control information.

Optionally, the control channel CRC scrambling codeword may include a cell radio network temporary identifier, a system information radio network temporary identifier, a paging radio network temporary identifier, and the like.

S602: The network device sends a data channel, where the data channel is scheduled through the control channel.

Optionally, if a CRC of the control channel is scrambled through a C-RNTI and/or a CS-RNTI, a start resource block of the data channel scheduled through the control channel is a start resource block in a bandwidth part (BWP), and the bandwidth part is a bandwidth part indicated by a first candidate control channel.

Optionally, if a CRC of the control channel is scrambled through a first RNTI a start resource block of the data channel scheduled through the control channel is a start resource block in a control-resource set, or a start resource block of the data channel scheduled through the control channel is a width of a start resource in an initial bandwidth part.

Optionally, the first RNTI is an RNTI that does not include at least a C-RNTI and/or a CS-RNTI.

For example, if a CRC of the control channel is scrambled by using an SI-RNTI or a CRC of the control channel is scrambled by using a P-RNTI, a start resource block of the data channel scheduled through the control channel is a start resource block in a control-resource set, and the control-resource set is a control-resource set associated with a search space set in which the control channel is located, or a start resource block of the data channel scheduled through the control channel is a width of a start resource in an initial bandwidth part.

Optionally, if a CRC of the control channel is scrambled through a second RNTI, a start resource block of the data channel scheduled through the control channel is a start resource block in a bandwidth part (BWP), and the bandwidth part is a bandwidth part indicated by a first candidate control channel.

Optionally, the second RNTI is a C-RNTI and/or a CS-RNTI.

For example, if a CRC of the control channel is scrambled through a C-RNTI and/or a CS-RNTI, a start resource block of the data channel scheduled through the control channel is a start resource block in a bandwidth part (BWP), and the bandwidth part is a bandwidth part indicated by a first candidate control channel.

On the basis of any one of the foregoing embodiments, optionally, when the network device determines that resources of at least two candidate control channels in at least two search spaces configured for a terminal device overlap, formats of control information carried on the at least two candidate control channels are different, and payloads of the control information carried on the at least two candidate control channels are the same, the network device may add a preset bit (padding bit) to control information in a non-fallback format, so that payload sizes (DCI payload size) of control information in different formats are different.

Correspondingly, after detecting a control channel on an overlapping resource, the terminal device may determine a format of control information based on a payload size of the control information carried on the control channel, and further correctly parse the control information on the detected control channel based on the format of the control information.

Optionally, a payload size of DCI in a non-fallback format is greater than a payload size of DCI in a fallback format.

For example, if a bit size of information in a non-fallback format is equal to the payload size of the DCI in the fallback format, the payload size of the DC in the non-fallback format includes the bit size of the information in the non-fallback format and the padding bit, so that the payload size of the DCI in the non-fallback format is greater than the payload size of the DCI in the fallback format.

In the foregoing process, because transmission efficiency of a control channel carrying control information in a non-fallback format is relatively high, adding a padding bit to the control information in the non-fallback format imposes relatively little impact on the transmission efficiency of the control channel.

On the basis of any one of the foregoing embodiments, optionally, when the network device determines that the resources of the at least two candidate control channels in the at least two search spaces configured for the terminal device overlap, the formats of the control information carried on the at least two candidate control channels are different, and the payloads of the control information carried on the at least two candidate control channels are the same, the network device scrambles different masks for CRCs in different control information formats.

Optionally, a mask used for a CRC in a fallback DCI format other than an RNTI is different from a mask used for a CRC in a non-fallback DCI format other than an RNTI.

For example, when the control information is in a fallback format, a CRC mask is a first CRC mask; or when the control information is in a non-fallback format, a CRC mask is a second CRC mask. The first CRC mask is different from the second CRC mask.

Correspondingly, the terminal device detects the control channel on the overlapped resource, and determines a CRC mask of the detected candidate control channel based on the format of the detected candidate control channel.

Optionally, if a DCI format of the detected candidate control channel is a fallback DCI format, a mask used for a CRC of the candidate control channel other than an RNTI is a first mask; or if a DCI format of the detected candidate control channel is a non-fallback DCI format, a mask used for a CRC of the candidate control channel other than an RNTI is a second mask. The first mask is different from the second mask.

In the foregoing process, the network device scrambles different masks in codewords carried on the control channel, so that the terminal device can determine, based on the scrambled masks in the codewords on the control channel, the format of the control information carried on the control channel, and further correctly parse the control information.

On the basis of any one of the foregoing embodiments, optionally, when the network device determines that the resources of the at least two candidate control channels in the at least two search spaces configured for the terminal device overlap, the formats of the control information carried on the at least two candidate control channels are different, and the payloads of the control information carried on the at least two candidate control channels are the same, the network device may add indication information to a preset bit in the control information, to indicate the format of the control information by using the indication information.

Correspondingly, after the terminal device detects the control channel on the overlapping resource, the terminal device may determine the format of the control information based on the indication information in the preset bit in the control information, and further correctly parse the control information carried on the control channel.

Figure 7:
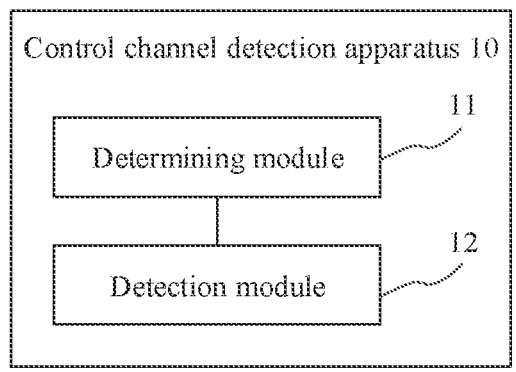
FIG. 7 is a schematic structural diagram of a control channel detection apparatus according to this application.

FIG. 7 is a schematic structural diagram of a control channel detection apparatus according to this application. Referring to FIG. 7, the control channel detection apparatus 10 may include a determining module 11 and a detection module 12.

The determining module 11 is configured to determine that resources of at least two candidate control channels overlap, where any two of the at least two candidate control channels are located in different search spaces.

The detection module 12 is configured to detect only at least one first candidate control channel in the at least two candidate control channels.

Optionally, the determining module 11 may perform S201 in the embodiment in FIG. 2 and S303 in the embodiment shown in FIG. 3.

Optionally, the detection module 12 may perform S202 in the embodiment in FIG. 2 and S305 in the embodiment shown in FIG. 3.

The control channel detection apparatus 10 provided in this application may execute the technical solutions shown in the embodiments in FIG. 2 and FIG. 3. Implementation principles and beneficial effects thereof are similar, and details are not described herein again.

In a possible implementation, search spaces in which the at least two candidate control channels are located include a first-type search space and a second-type search space.

In another possible implementation, the type of a search space in which the at least one first candidate control channel is located is the first-type.

The at least two candidate control channels meet at least one of the following conditions:
  none of the at least two candidate control channels includes a carrier indicator field; and
  the at least two candidate control channels include a candidate control channel used for a first downlink control information format and a candidate control channel used for a second downlink control information format.

In another possible implementation, a candidate control channel that is in the at least two candidate control channels and that is located in the second-type search space is a subset of a candidate control channel that is in the at least two candidate control channels and that is located in the first-type search space.

In another possible implementation, the search space in which the at least one first candidate control channel is located is the first-type search space or the second-type search space.

The at least one first candidate control channel is related to indexes of the at least two candidate control channels and/or at least one of indexes of search space sets in which the at least two candidate control channels are located.

In another possible implementation, a search space in which the at least one first candidate control channel is located is a second-type search space, search spaces in which the at least two candidate control channels are located each are the second-type search space, and each of the at least one first candidate control channel is used for a first downlink control information format.

In another possible implementation, each of the at least one first candidate control channel is used for a second downlink control information format, each of the at least two candidate control channels is used for the second downlink control information format, and none of the at least two candidate control channels includes a carrier indicator field.

In another possible implementation, the at least two candidate control channels meet at least one of the following conditions:
  none of the at least two candidate control channels includes a carrier indicator field;
  the at least two candidate control channels include the candidate control channel used for the first downlink control information format and the candidate control channel used for the second downlink control information format; and
  each of the at least two candidate control channels is used for the first downlink control information format.

In another possible implementation, each of the at least one first candidate control channel includes a carrier indicator field.

The at least two candidate control channels meet at least one of the following conditions:
  only some of the at least two candidate control channels each include a carrier indicator field, or only some of the at least two candidate control channels each do not include a carrier indicator field;

the at least two candidate control channels include the candidate control channel used for the first downlink control information format and the candidate control channel used for the second downlink control information format; and each of the at least two candidate control channels is used for the first downlink control information format.

In another possible implementation, a search space in which the at least one first candidate control channel is located is a second-type search space.

Only some of the at least one first candidate control channel each include a carrier indicator field, or only some of the at least one first candidate control channel each do not include a carrier indicator field.

In another possible implementation, the first-type search space is a common search space: and/or the second-type search space is a specific search space; and/or the first downlink control information format is a non-fallback format: and/or the second downlink control information format is a fallback format.

In another possible implementation, the detection module 12 detects a second control channel in the at least one first candidate control channel.

A search space in which the second control channel is located is the first-type search space, a start resource block of a data channel scheduled through the second control channel is a start resource block in a control-resource set, and the control-resource set is a control-resource set associated with a search space set in which the second control channel is located; or a search space in which the second control channel is located is the second-type search space, a start resource block of a data channel scheduled through the second control channel is a start resource block in a bandwidth part, and the bandwidth part is a bandwidth part indicated by the second control channel.

In another possible implementation, the at least two candidate control channels meet at least one of the following conditions:

the search spaces in which the at least two candidate control channels are located are located on a same component carrier or different component carriers;

the at least two candidate control channels include a same start control channel element index;

the at least two candidate control channels have a same payload size: and cyclic redundancy codes CRC of the at least two control channels are scrambled by using a cell radio network temporary identifier C-RNTI or a configured scheduling radio network temporary identifier CS-RNTI.

The control channel detection apparatus 10 provided in this application may execute the technical solutions shown in the embodiments in FIG. 2 and FIG. 3. Implementation principles and beneficial effects thereof are similar, and details are not described herein again.

Figure 8:
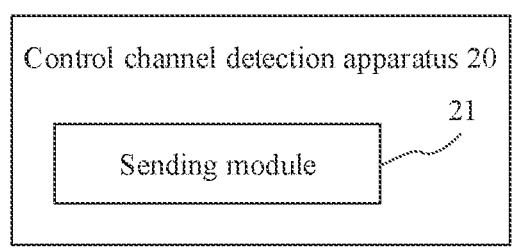
FIG. 8 is a schematic structural diagram of another control channel detection apparatus according to this application.

FIG. 8 is a schematic structural diagram of another control channel detection apparatus according to this application. Referring to FIG. 8, the control channel detection apparatus 20 may include a sending module 21.

The sending module 21 is configured to send a second control channel, where the second control channel is a control channel in at least two candidate control channels, resources of the at least two candidate control channels overlap, and any two of the at least two candidate control channels are located in different search spaces.

The sending module 21 is further configured to send a first data channel, where the first data channel is scheduled through the second control channel.

Optionally, the sending module may perform S401 and S402 in the embodiment shown in FIG. 4.

It should be noted that the control channel detection apparatus 20 provided in this application may execute the technical solution shown in the embodiment in FIG. 4. Implementation principles and beneficial effects thereof are similar, and details are not described herein again.

In a possible implementation, the sending module 21 does not send a candidate control channel other than at least one first candidate control channel in the at least two candidate control channels, where the second control channel is one of the at least one first candidate control channel.

Figure 9:
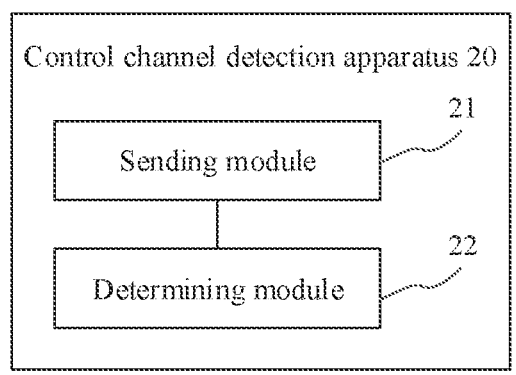
FIG. 9 is a schematic structural diagram of still another control channel detection apparatus according to this application.

FIG. 9 is a schematic structural diagram of still another control channel detection apparatus according to this application. On the basis of the embodiment shown in FIG. 8, referring to FIG. 9, the control channel detection apparatus 20 may further include a determining module 22.

The determining module 22 is configured to determine the second control channel.

Optionally, the determining module 22 may be further configured to determine the at least one first candidate control channel, and determine the second control channel in the at least one first candidate control channel.

In another possible implementation, search spaces in which the at least two candidate control channels are located include a first-type search space and a second-type search space.

In another possible implementation, the type of a search space in which the at least one first candidate control channel is located is the first-type.

The at least two candidate control channels meet at least one of the following conditions:

none of the at least two candidate control channels includes a carrier indicator field; and the at least two candidate control channels include a candidate control channel used for a first downlink control information format and a candidate control channel used for a second downlink control information format.

In another possible implementation, a candidate control channel that is in the at least two candidate control channels and that is located in the second-type search space is a subset of a candidate control channel that is in the at least two candidate control channels and that is located in the first-type search space.

In another possible implementation, the search space in which the at least one first candidate control channel is located is the first-type search space or the second-type search space.

The at least one first candidate control channel is related to indexes of the at least two candidate control channels and/or at least one of indexes of search space sets in which the at least two candidate control channels are located.

In another possible implementation, a search space in which the at least one first candidate control channel is located is a second-type search space, search spaces in which the at least two candidate control channels are located each are the second-type search space, and each of the at least one first candidate control channel is used for a first downlink control information format.

In another possible implementation, each of the at least one first candidate control channel is used for a second downlink control information format, each of the at least two candidate control channels is used for the second downlink control information format, and none of the at least two candidate control channels includes a carrier indicator field.

In another possible implementation, the at least two candidate control channels meet at least one of the following conditions:
- none of the at least two candidate control channels includes a carrier indicator field;
- the at least two candidate control channels include the candidate control channel used for the first downlink control information format and the candidate control channel used for the second downlink control information format; and
- each of the at least two candidate control channels is used for the first downlink control information format.

In another possible implementation, each of the at least one first candidate control channel includes a carrier indicator field.

The at least two candidate control channels meet at least one of the following conditions:
- only some of the at least two candidate control channels each include a carrier indicator field, or only some of the at least two candidate control channels each do not include a carrier indicator field;
- the at least two candidate control channels include the candidate control channel used for the first downlink control information format and the candidate control channel used for the second downlink control information format: and
- each of the at least two candidate control channels is used for the first downlink control information format.

In another possible implementation, a search space in which the at least one first candidate control channel is located is a second-type search space.

Only some of the at least one first candidate control channel each include a carrier indicator field, or only some of the at least one first candidate control channel each do not include a carrier indicator field.

In another possible implementation, the first-type search space is a common search space; and/or
- the second-type search space is a specific search space: and/or
- the first downlink control information format is a non-fallback format: and/or
- the second downlink control information format is a fallback format.

In another possible implementation, a start resource block of the first data channel is a start resource block in a control-resource set, the control-resource set is a control-resource set associated with a search space set in which the second control channel is located, and a search space in which the second control channel is located is the first-type search space; or
- a start resource block of the first data channel is a start resource block in a bandwidth part, the bandwidth part is a bandwidth part indicated by the second control channel, and a search space in which the second control channel is located is the second-type search space.

In another possible implementation, the search spaces in which the at least two candidate control channels are located are located on a same component carrier or different component carriers: and
- the at least two candidate control channels include a same start control channel element index.

It should be noted that the control channel detection apparatus 20 provided in this application may execute the technical solution shown in the embodiment in FIG. 4. Implementation principles and beneficial effects thereof are similar, and details are not described herein again.

Figure 10:
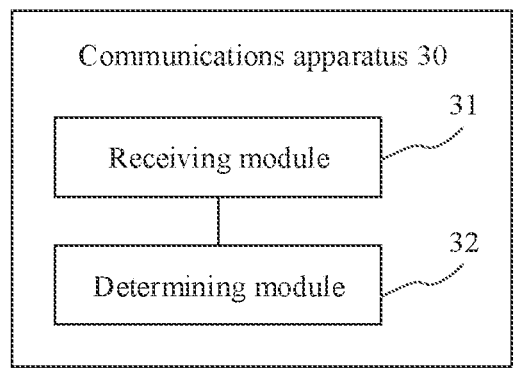
FIG. 10 is a schematic structural diagram of a communications apparatus according to this application.

FIG. 10 is a schematic structural diagram of a communications apparatus according to this application. Referring to FIG. 10, the communications apparatus 30 may include a receiving module 31 and a determining module 32.

The receiving module 31 is configured to receive a control channel located in a common search space.

The determining module 32 is configured to determine a scheduled data channel based on the control channel.

Optionally, the receiving module 31 may perform S501 shown in the embodiment in FIG. 5.

Optionally, the determining module 32 may perform S502 shown in the embodiment in FIG. 5.

It should be noted that the communications apparatus 30 in this application may execute the technical solution shown in the embodiment in FIG. 5. Implementation principles and beneficial effects thereof are similar, and details are not described herein again.

In a possible implementation, the determining module 32 may obtain control information and a control channel CRC scrambling codeword from the control channel, and determine the scheduled data channel based on the control information and the scrambling codeword.

In another possible implementation, if a CRC of the control channel is scrambled by using a C-RNTI and/or a CS-RNTI, a start resource block of the data channel scheduled through the control channel is a start resource block in a bandwidth part (BWP), and the bandwidth part is a bandwidth part indicated by a first candidate control channel.

In another possible implementation, if a CRC of the control channel is scrambled by using a first RNTI, a start resource block of the data channel scheduled through the control channel is a start resource block in a control-resource set, or a start resource block of the data channel scheduled through the control channel is a width of a start resource in an initial bandwidth part.

Optionally, the first RNTI is an RNTI that does not include at least a C-RNTI and/or a CS-RNTI.

In another possible implementation, if a CRC of the control channel is scrambled by using an SI-RNTI or a P-RNTI, a start resource block of the data channel scheduled through the control channel is a start resource block in a control-resource set, and the control-resource set is a control-resource set associated with a search space set in which the control channel is located; or a start resource block of the data channel scheduled through the control channel is a width of a start resource in an initial bandwidth part.

In another possible implementation, if a CRC of the control channel is scrambled by using a second RNTI, a start resource block of the data channel scheduled through the control channel is a start resource block in a bandwidth part (BWP), and the bandwidth part is a bandwidth part indicated by a first candidate control channel.

Optionally, the second RNTI is a C-RNTI and/or a CS-RNTI.

In another possible implementation, if a CRC of the control channel is scrambled by using a C-RNTI and/or a CS-RNTI, a start resource block of the data channel scheduled through the control channel is a start resource block in a bandwidth part (BWP), and the bandwidth part is a bandwidth part indicated by a first candidate control channel.

It should be noted that the communications apparatus 30 in this application may execute the technical solution shown in the embodiment in FIG. 5. Implementation principles and beneficial effects thereof are similar, and details are not described herein again.

Figure 11:
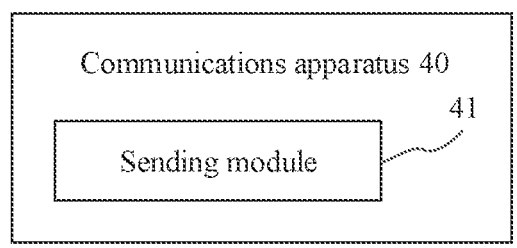
FIG. 11 is a schematic structural diagram of another communications apparatus according to this application.

FIG. 11 is a schematic structural diagram of another communications apparatus according to this application. Referring to FIG. 11, the communications apparatus 40 may include a sending module 41.

The sending module 41 is configured to send a control channel, where the control channel is located in a common search space.

The sending module 41 is further configured to send a data channel, where the data channel is scheduled through the control channel.

Optionally, the sending module 41 may perform S601 and S602 in the embodiment shown in FIG. 6.

It should be noted that the communications apparatus 40 in this application may execute the technical solution shown in the embodiment in FIG. 6. Implementation principles and beneficial effects thereof are similar, and details are not described herein again.

Figure 12:
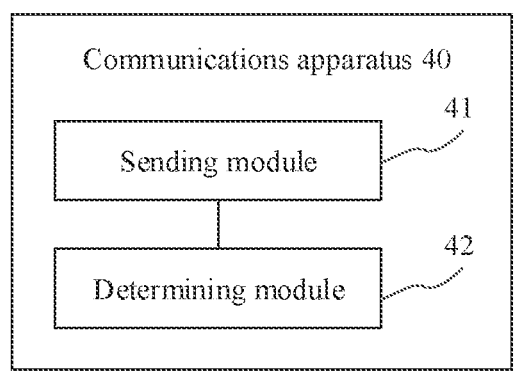
FIG. 12 is a schematic structural diagram of still another communications apparatus according to this application.

FIG. 12 is a schematic structural diagram of still another communications apparatus according to this application. On the basis of the embodiment shown in FIG. 11, referring to FIG. 12, the communications apparatus 40 may further include a determining module 42.

The determining module 42 is configured to determine the control channel sent in the common search space.

In a possible implementation, if a CRC of the control channel is scrambled by using a C-RNTI and/or a CS-RNTI, a start resource block of the data channel scheduled through the control channel is a start resource block in a bandwidth part (BWP), and the bandwidth part is a bandwidth part indicated by a first candidate control channel.

In another possible implementation, if a CRC of the control channel is scrambled by using a first RNTI, a start resource block of the data channel scheduled through the control channel is a start resource block in a control-resource set, or a start resource block of the data channel scheduled through the control channel is a width of a start resource in an initial bandwidth part.

Optionally, the first RNTI is an RNTI that does not include at least a C-RNTI and/or a CS-RNTI.

In another possible implementation, if a CRC of the control channel is scrambled by using an SI-RNTI or a CRC of the control channel is scrambled by using a P-RNTI, a start resource block of the data channel scheduled through the control channel is a start resource block in a control-resource set, and the control-resource set is a control-resource set associated with a search space set in which the control channel is located: or a start resource block of the data channel scheduled through the control channel is a width of a start resource in an initial bandwidth part.

In another possible implementation, if a CRC of the control channel is scrambled by using a second RNTI, a start resource block of the data channel scheduled through the control channel is a start resource block in a bandwidth part (BWP), and the bandwidth part is a bandwidth part indicated by a first candidate control channel.

Optionally, the second RNTI is a C-RNTI and/or a CS-RNTI.

In another possible implementation, if a CRC of the control channel is scrambled by using a C-RNTI and/or a CS-RNTI, a start resource block of the data channel scheduled through the control channel is a start resource block in a bandwidth part (BWP), and the bandwidth part is a bandwidth part indicated by a first candidate control channel.

It should be noted that the communications apparatus 40 in this application may execute the technical solution shown in the embodiment in FIG. 6. Implementation principles and beneficial effects thereof are similar, and details are not described herein again.

Figure 13:
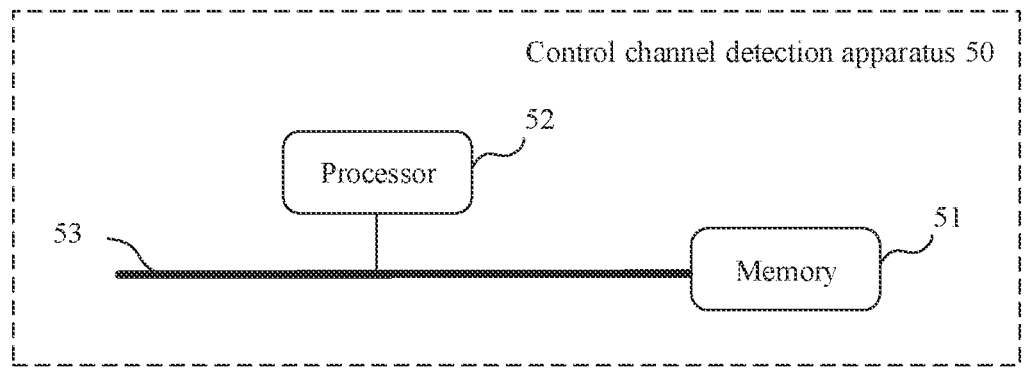
FIG. 13 is a schematic diagram of a hardware structure of a control channel detection apparatus according to this application.

FIG. 13 is a schematic diagram of a hardware structure of a control channel detection apparatus according to this application. Referring to FIG. 13, the control channel detection apparatus 50 includes a memory 51 and a processor 52. The memory 51 communicates with the processor 52. For example, the memory 51 communicates with the processor 52 through a communications bus 53. The memory 51 is configured to store a computer program, and the processor 52 executes the computer program to implement the methods shown in the embodiments in FIG. 2 and FIG. 3.

Optionally, the control channel detection apparatus may further include a transmitter and/or a receiver.

Optionally, the processor and/or the receiver shown in this application may perform S202 in the embodiment shown in FIG. 2 and S305 in the embodiment in FIG. 3.

Optionally, the processor and/or the receiver shown in this application may implement a function of the detection module 12 in the control channel detection apparatus 10. Details are not described herein again.

Optionally, the processor may be a central processing unit (CPU), or may be another general purpose processor, a digital signal processor (DSP), an application-specific integrated circuit (Application Specific Integrated Circuit, ASIC), or the like. The general purpose processor may be a microprocessor, or the processor may be any conventional processor, or the like. The steps (S201 and S202 in the embodiment in FIG. 2, and S301 to S305 in the embodiment in FIG. 3) of the methods disclosed in this application may be directly performed by a hardware processor, or may be performed by using a combination of hardware and software modules in the processor.

Figure 14:
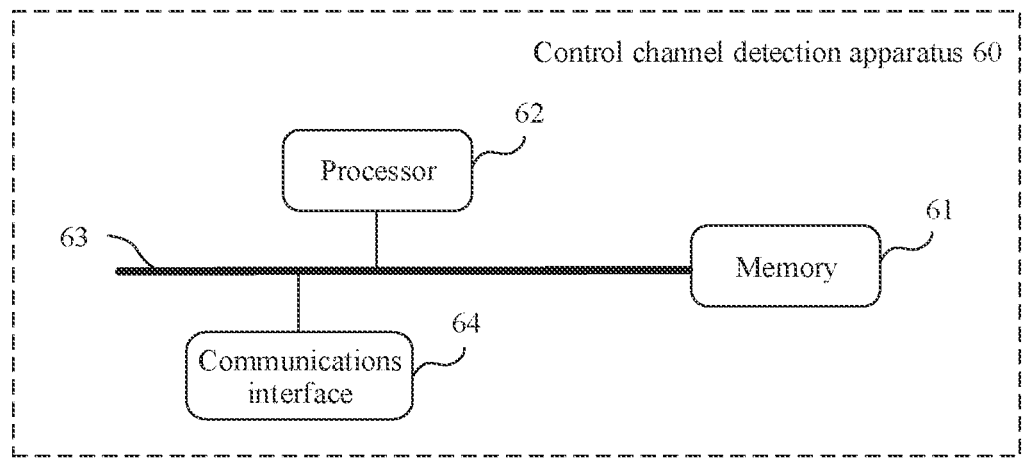
FIG. 14 is a schematic diagram of a hardware structure of another control channel detection apparatus according to this application.

FIG. 14 is a schematic diagram of a hardware structure of another control channel detection apparatus according to this application. Referring to FIG. 14, the control channel detection apparatus 60 includes a memory 61, a processor 62, and a communications interface 64. The memory 61 communicates with the processor 62. For example, the memory 61 communicates with the processor 62 through a communications bus 63. The memory 61 is configured to store a computer program, and the processor 62 executes the computer program to implement the methods shown in the foregoing embodiments.

Optionally, the communications interface 64 may include a transmitter and/or a receiver.

Optionally, the processor may be a central processing unit (CPU), or may be another general purpose processor, a digital signal processor (DSP), an application-specific integrated circuit (Application Specific Integrated Circuit, ASIC), or the like. The general purpose processor may be a microprocessor, or the processor may be any conventional processor, or the like. The steps (S401 and S402 in the embodiment in FIG. 4) of the method disclosed in this application may be directly performed by a hardware processor, or may be performed by using a combination of hardware and software modules in the processor.

Figure 15:
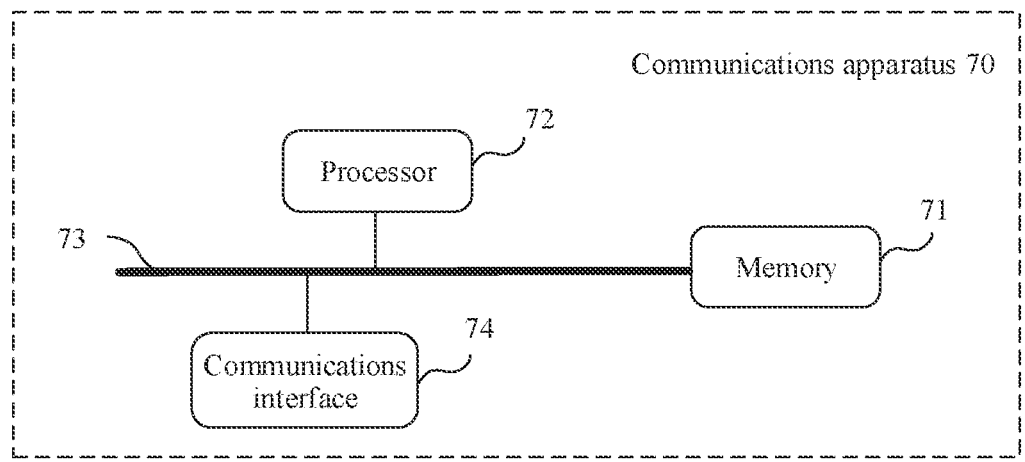
FIG. 15 is a schematic diagram of a hardware structure of a communications apparatus according to this application.

FIG. 15 is a schematic diagram of a hardware structure of a communications apparatus according to this application. Referring to FIG. 15, the communications apparatus 70 includes a memory 71, a processor 72, and a communications interface 74. The memory 71 communicates with the processor 72. For example, the memory 71 communicates with the processor 72 through a communications bus 73. The memory 71 is configured to store a computer program, and the processor 72 executes the computer program to implement the methods shown in the foregoing embodiments.

Optionally, the communications interface 74 may include a transmitter and/or a receiver.

Optionally, the processor may be a central processing unit (CPU), or may be another general purpose processor, a digital signal processor (DSP), an application-specific integrated circuit (ASIC), or the like. The general purpose processor may be a microprocessor, or the processor may be any conventional processor, or the like. The steps (S501 and S502 in the embodiment in FIG. 5) of the method disclosed in this application may be directly performed by a hardware processor, or may be performed by using a combination of hardware and software modules in the processor.

Figure 16:
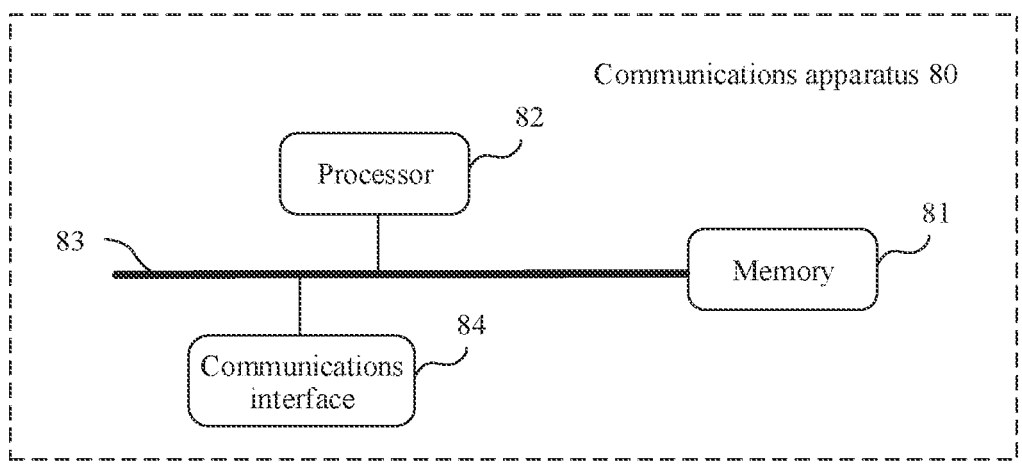
FIG. 16 is a schematic diagram of a hardware structure of another communications apparatus according to this application.

FIG. 16 is a schematic diagram of a hardware structure of another communications apparatus according to this application. Referring to FIG. 16, the communications apparatus 80 includes a memory 81, a processor 82, and a communications interface 84. The memory 81 communicates with the processor 82. For example, the memory 81 communicates with the processor 82 through a communications bus 83. The memory 81 is configured to store a computer program, and the processor 82 executes the computer program to implement the methods shown in the foregoing embodiments.

Optionally, the communications interface 84 may include a transmitter and/or a receiver.

Optionally, the processor may be a central processing unit (CPU), or may be another general purpose processor, a digital signal processor (DSP), an application-specific integrated circuit (ASIC), or the like. The general purpose processor may be a microprocessor, or the processor may be any conventional processor, or the like. The steps (S601 and S602 in the embodiment in FIG. 6) of the method disclosed in this application may be directly performed by a hardware processor, or may be performed by using a combination of hardware and software modules in the processor.

This application provides a storage medium. The storage medium is configured to store a computer program, and the computer program is used to implement the control channel detection methods in the embodiments in FIG. 2 and FIG. 3.

This application provides a storage medium. The storage medium is configured to store a computer program, and the computer program is used to implement the control channel detection method in the embodiment in FIG. 4.

This application provides a storage medium. The storage medium is configured to store a computer program, and the computer program is used to implement the communications method in the embodiment in FIG. 5.

This application provides a storage medium. The storage medium is configured to store a computer program, and the computer program is used to implement the communications method in the embodiment in FIG. 6.

All or some of the steps of the method embodiments may be implemented by hardware related to a program instruction. The foregoing program may be stored in a readable memory. When the program is executed, the steps in the foregoing method embodiments are performed. The foregoing memory (storage medium) includes a read-only memory (ROM for short), a RAM, a flash memory, a hard disk, a solid-state drive, a magnetic tape (English: magnetic tape), a floppy disk (English: floppy disk), an optical disc (English: optical disc), and any combination thereof.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processing unit of any other programmable data processing device to generate a machine, so that instructions executed by the computer or the processing unit of any other programmable data processing device generate an apparatus for implementing a specific function in one or more processes in the flowcharts and/or in one or more blocks in the block diagrams.

These computer program instructions may be stored in a computer-readable memory that can guide a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto the computer or another programmable data processing device, so that a series of operations and steps are performed on the computer or the another programmable device, and computer-implemented processing is generated. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this application without departing from the spirit and scope of this application. In this way, this application is intended to cover these modifications and variations of the embodiments of this application provided that they fall within the scope of protection defined by the following claims and their equivalent technologies.

In this application, the term "including" and a variant thereof may refer to non-limitative inclusion; the term "or" and a variant thereof may refer to "and/or". In this application, the terms "first", "second", and the like are intended to distinguish between similar objects but do not necessarily indicate a specific order or sequence. In this application, "a plurality of" means two or more than two, and "and/or" describes an association relationship between associated objects and represents that three relationships may exist. For example. A and/or B may represent three cases: Only A exists, both A and B exist, and only B exists. The character "/" generally represents an "or" relationship between the associated objects.

What is claimed is:

1. A control channel detection method, comprising:
   determining, by a terminal device, that resources of a first candidate control channel and a second candidate control channel overlap, wherein the first candidate control channel and the second candidate control channel are located in different search spaces, a type of the search space in which the first candidate control channel is located is common search space, and a type of the search space in which the second candidate control channel is located is specific search space; and
   detecting, by the terminal device, only the first candidate control channel.

2. The method according to claim 1, wherein
   downlink control information (DCI) carried on the first candidate control channel and the second candidate control channel does not comprise a carrier indicator field, and the first candidate control channel and the second candidate control channel comprise downlink control information having a same format.

3. The method according to claim 1 wherein each of the first candidate control channel and the second candidate control channel comprises a candidate control channel in a second downlink control information format, and the second downlink control information format is a DCI format 0_0 or a DCI format 1_0.

4. The method according to claim 1, wherein
search spaces in which the first candidate control channel and the second candidate control channel are located are associated with a same control-resource set; and
wherein the resources of the first candidate control channel and the second candidate control channel overlapping comprises the first candidate control channel and the second candidate control channel occupying at least one same control channel element (CCE).

5. The method according to claim 1, wherein the first candidate control channel and the second candidate control channel meet at least one of the following conditions:
the first candidate control channel and the second candidate control channel comprise a same start control channel element index;
the first candidate control channel and the second candidate control channel have a same payload size; or
cyclic redundancy codes (CRC) of the first candidate control channel and the second candidate control channel are scrambled by using a cell radio network temporary identifier (C-RNTI) or a configured scheduling radio network temporary identifier (CS-RNTI).

6. A control channel detection method, comprising:
sending, by a network device, a second control channel, wherein the second control channel is a control channel in a first candidate control channel and a second candidate control channel, resources of the first candidate control channel and the second candidate control channel overlap, and the first candidate control channel and the second candidate control channel are located in different search spaces, a type of the search space in which the first candidate control channel is located is common search space, and a type of the search space in which the second candidate control channel is located is specific search space; and
sending, by the network device, a first data channel, wherein the first data channel is scheduled through the second control channel.

7. The method according to claim 6, wherein the method further comprises:
skipping sending, by the network device, a candidate control channel other than the first candidate control channel in the first candidate control channel and the second candidate control channel.

8. The method according to claim 7, wherein
downlink control information (DCI) carried on each of the first candidate control channel and the second candidate control channel does not comprise a carrier indicator field, and the first candidate control channel and the second candidate control channel comprise a same downlink control information format.

9. The method according to claim 8, wherein
each of the first candidate control channel and the second candidate control channel comprises a candidate control channel in a second downlink control information format, and the second downlink control information format is a DCI format 0_0 or a DCI format 1_0.

10. The method according to claim 7, wherein
search spaces in which the first candidate control channel and the second candidate control channel are located are associated with a same control-resource set; and
wherein the resources of the first candidate control channel and the second candidate control channel overlapping comprises the first candidate control channel and the second candidate control channel occupying at least one same control channel element (CCE).

11. An apparatus, comprising:
one or more processors, and
a memory configure to store program instructions;
wherein, when executed by the one or more processors, the instructions cause the apparatus to:
determine that resources of a first candidate control channel a second candidate control channel overlap, wherein the first candidate control channel and the second candidate control channel are located in different search spaces, a type of the search space in which the first candidate control channel is located is common search space, and a type of the search space in which the second candidate control channel is located is specific search space; and
detect only the first candidate control channel.

12. The apparatus according to claim 11, wherein
downlink control information (DCI) carried on the first candidate control channel and the second candidate control channel does not comprise a carrier indicator field, and the first candidate control channel and the second candidate control channel comprise a same downlink control information format.

13. The apparatus according to claim 12, wherein
each of the first candidate control channel and the second candidate control channel comprises a candidate control channel in a second downlink control information format, and the second downlink control information format is a DCI format 0_0 or a DCI format 1_0.

14. The apparatus according to claim 11, wherein
search spaces in which the first candidate control channel and the second candidate control channel are located are associated with a same control-resource set; and
wherein the resources of the first candidate control channel and the second candidate control channel overlapping comprises the first candidate control channel and the second candidate control channel occupying at least one same control channel element (CCE).

15. The apparatus according to claim 11, wherein the first candidate control channel and the second candidate control channel meet at least one of the following conditions:
the first candidate control channel and the second candidate control channel comprise a same start control channel element index;
the first candidate control channel and the second candidate control channel have a same payload size; or
cyclic redundancy codes (CRC) of the first candidate control channel and the second candidate control channel are scrambled by using a cell radio network temporary identifier (C-RNTI) or a configured scheduling radio network temporary identifier (CS-RNTI).

16. An apparatus, comprising:
one or more processors, and
a memory configure to store program instructions;
wherein, when executed by the one or more processors, the instructions cause the apparatus to:
send a second control channel, wherein the second control channel is a control channel in a first candidate control channel and a second candidate control channel, resources of the first candidate control channel and the second candidate control channel overlap, and the first candidate control channel and the second candidate control channel are located in different search spaces, a type of the search space in which the first candidate control channel is located is common search space, and a type of the search space in which the second candidate control channel is located is specific search space; and send a first data channel, wherein the first data channel is scheduled through the second control channel.

17. The apparatus according to claim 16, wherein the instructions cause the apparatus further to:

skip sending a candidate control channel other than the at least one first candidate control channel in the first candidate control channel and the second candidate control channel.

18. The apparatus according to claim 17, wherein downlink control information (DCI) carried on each of the first candidate control channel and the second candidate control channel does not comprise a carrier indicator field, and the first candidate control channel and the second candidate control channel comprise a same downlink control information format.

19. The apparatus according to claim 18, wherein each of the first candidate control channel and the second candidate control channel comprises a candidate control channel in a second downlink control information format, and the second downlink control information format is a DCI format 0_0 or a DCI format 1_0.

20. The apparatus according to claim 17, wherein search spaces in which the first candidate control channel and the second candidate control channel are located are associated with a same control-resource set; and wherein the resources of the first candidate control channel and the second candidate control channel overlapping comprises the first candidate control channel and the second candidate control channel occupying at least one same control channel element (CCE).

\* \* \* \* \*

UNITED STATES PATENT AND TRADEMARK OFFICE
CERTIFICATE OF CORRECTION

PATENT NO. : 11,997,033 B2
APPLICATION NO. : 17/213749
DATED : May 28, 2024
INVENTOR(S) : Xu Zhang et al.

It is certified that error appears in the above-identified patent and that said Letters Patent is hereby corrected as shown below:

In the Claims

In Column 57, In Line 5, In Claim 3, delete "claim 1" and insert -- claim 1, --.

Signed and Sealed this
Twelfth Day of November, 2024

Katherine Kelly Vidal
*Director of the United States Patent and Trademark Office*